US012342799B2

US 12,342,799 B2
Jul. 1, 2025

(12) United States Patent
Schlemmer

(10) Patent No.: US 12,342,799 B2
(45) Date of Patent: Jul. 1, 2025

(54) MODULAR HABITAT SYSTEM AND METHOD

(71) Applicant: Gary N. Schlemmer, Titusville, FL (US)

(72) Inventor: Gary N. Schlemmer, Titusville, FL (US)

(*) Notice: Subject to any disclaimer, the term of this patent is extended or adjusted under 35 U.S.C. 154(b) by 450 days.

(21) Appl. No.: 17/575,119

(22) Filed: Jan. 13, 2022

(65) Prior Publication Data

US 2022/0132816 A1   May 5, 2022

Related U.S. Application Data

(63) Continuation of application No. 16/103,484, filed on Aug. 14, 2018, now Pat. No. 11,246,298, which is a continuation-in-part of application No. 29/644,052, filed on Apr. 13, 2018, now abandoned, and a continuation-in-part of application No. 29/644,056, filed on Apr. 13, 2018, now abandoned, and a continuation-in-part of application No. 29/644,053, filed on Apr. 13, 2018, now abandoned, and a continuation-in-part of application No. 29/627,589, filed on Nov. 28, 2017, now abandoned.

(51) Int. Cl.
  *A01K 63/06* (2006.01)
  *A01K 63/00* (2017.01)
  *A01K 63/04* (2006.01)

(52) U.S. Cl.
  CPC .......... *A01K 63/065* (2013.01); *A01K 63/003* (2013.01); *A01K 63/047* (2013.01)

(58) Field of Classification Search
  USPC .................. 119/417, 418, 419, 420, 421, 65, 119/200–247; 47/69; D30/117
  See application file for complete search history.

(56) References Cited

U.S. PATENT DOCUMENTS

| | | | | |
|---|---|---|---|---|
| 2,720,188 A | * | 10/1955 | Hofrichter | A01K 31/04 |
| | | | | 119/537 |
| 2,933,062 A | * | 4/1960 | Geerlings | A01K 5/0241 |
| | | | | 119/59 |
| 3,870,019 A | | 3/1975 | McNicol | |
| 3,877,420 A | | 4/1975 | Eagleson, Jr. | |
| D241,254 S | | 8/1976 | Kitson | |

(Continued)

FOREIGN PATENT DOCUMENTS

| | | | | |
|---|---|---|---|---|
| DE | 4319474 A1 | 12/1994 | | |
| GB | 2130465 A | * | 6/1984 | A01G 31/02 |

OTHER PUBLICATIONS

Improvised Life A Treasury of Inspiring Ideas, Clipped Together Shelving Pt. 2 Cardboard Boxes, Apr. 21, 2010.

*Primary Examiner* — Andrea M Valenti

(74) *Attorney, Agent, or Firm* — Fox Rothschild LLP; Carol E. Thorstad-Forsyth

(57) ABSTRACT

Modular habitat structure (MHS) which accommodates one or more live inhabitants is comprised of a rigid pillar which extends linearly away from a base end toward an upper end. A plurality of major system components disposed at different locations along a length of the rigid pillar are each comprised of modular segments. A control unit controls a plurality of electronic devices integrated in the MHS, including one or more video cameras which generate live video streams of a wildlife habitat within the MHS, and communicates the video streams from the MHS to a remote computing device.

22 Claims, 15 Drawing Sheets

(56) References Cited

U.S. PATENT DOCUMENTS

| | | |
|---|---|---|
| D260,306 S | 8/1981 | Biro et al. |
| D260,565 S | 9/1981 | Biro et al. |
| 4,448,150 A | 5/1984 | Catsimpoolas |
| D293,946 S | 1/1988 | Grant |
| D304,870 S | 11/1989 | Mason |
| 5,183,004 A | 2/1993 | Trent et al. |
| 5,251,399 A | 10/1993 | Rasmussen |
| 5,577,464 A | 11/1996 | Wellington et al. |
| 5,713,304 A | 2/1998 | de Vosjoli et al. |
| D394,734 S | 5/1998 | D'Odorico |
| 5,752,341 A | 5/1998 | Goldfarb |
| 5,799,614 A | 9/1998 | Greenwood |
| 6,158,387 A | 12/2000 | Gabriel et al. |
| 7,594,481 B2 * | 9/2009 | Carter ............ A01K 1/031 119/456 |
| 9,655,350 B2 | 5/2017 | Lari |
| D866,677 S | 11/2019 | Horikoshi |
| D875,843 S | 2/2020 | Muraki |
| 10,918,078 B1 * | 2/2021 | Betts-Lacroix ...... A01K 29/005 |
| 11,246,298 B2 * | 2/2022 | Schlemmer .......... A01K 63/003 |
| 2007/0079765 A1 | 4/2007 | Carter et al. |
| 2007/0221133 A1 * | 9/2007 | Richmond ........... A01K 39/012 119/72 |
| 2012/0085291 A1 * | 4/2012 | Conger ................ A01K 1/0047 119/419 |
| 2015/0296726 A1 * | 10/2015 | Higgins ................. A01G 31/06 47/62 R |
| 2017/0251642 A1 | 9/2017 | Capodice |
| 2017/0339910 A1 | 11/2017 | Heldt |
| 2019/0110417 A1 * | 4/2019 | Zeng .................... A01K 63/045 |
| 2019/0159435 A1 | 5/2019 | Schlemmer |

* cited by examiner

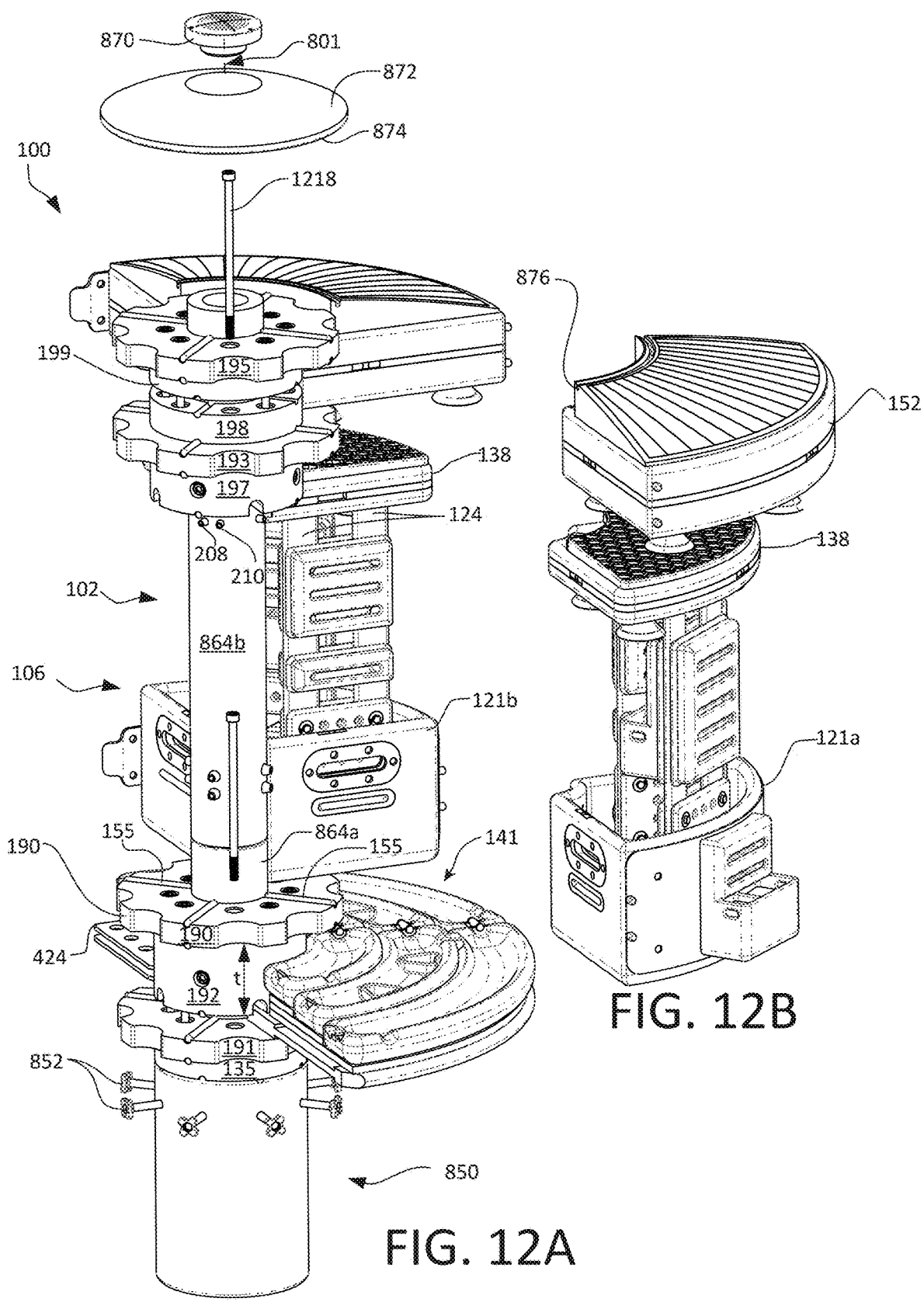

MODULAR HABITAT SYSTEM AND METHOD

RELATED APPLICATIONS

This patent application is a continuation of U.S. patent application Ser. No. 16/103,484 filed on Aug. 14, 2018, which is a continuation-in-part of the U.S. Design patent application No. 29/627,589 (the '589 Application) filed on Nov. 28, 2017, the U.S. Design patent application No. 29/644,052 (the '052 Application) filed on Apr. 13, 2018, the U.S. Design patent application No. 29/644,053 (the '053 Application) filed on Apr. 13, 2018 and the U.S. Design patent application No. 29/644,056 (the '056 Application) filed on Apr. 13, 2018. The disclosures of '589, '052, '053 and '056 applications are incorporated herein by reference in full.

BACKGROUND

Statement of the Technical Field

The technical field of this disclosure concerns artificial habitats, and more particularly concerns methods and systems for low-maintenance, modular habitat systems and methods which sustainably mimic a natural wildlife environment.

Description of the Related Art

Outdoor artificial ponds et al. and indoor vivariums are commonly used at a nature hobbyist's personal residence, a businessperson's work site, an educator's classroom or a scientist's field laboratory to showcase nature's beauty, promote serenity and/or increase the knowledge base derived from observing real-time nature occurrences. At times the pond owner may choose to move. But disassembling, packing and transporting conventional artificial ponds and/or indoor vivariums can be a monumental task. In the case of an artificial pond, the owner may often find it more practical to include their artificial pond in the sale of their property rather than to disassemble and transport the entire system. Moving a vivarium can similarly be a tedious chore and when attempted can be quite dangerous due to the relatively fragile nature of the glass which is used to construct the vivarium structure.

Another problem associated with artificial ponds, vivariums and the like is the constant monitoring, filtering and pumping of its water supply. The water maintenance, filtration and pumping costs combined with the associated chore-time spent working this issue can become the primary reason an owner loses interest in this effort. Providing proper food to plant and animal inhabitants is a never-ending expense. Conventional artificial ponds, vivariums and the like generally offer no practical way to biomimically harvest rainwater or grow/attract an adequate amount of live food to be preyed upon by inhabitants. A further limitation associated with conventional artificial ponds, vivariums and the like is that they do not take full advantage to witness wild and free inhabitant activity via the use of real-time videography gear. A further concern with conventional artificial ponds and outdoor vivariums is that raccoons and various predators may wreak havoc and destroy these microhabitats overnight.

Conventional decorative water fountains are not primarily designed to harbor and/or sustain a natural habitat for inhabitants. Small greenhouses are primarily used for nurturing plants and are not used to provide native flora for native fauna. Gazebos encourage outdoor human activities but they are lacking in providing habitat for nature to thrive in when the humans are not present.

Conventional vivariums can be set up with a video camera for users to observe inhabitants. But conventional indoor glass vivariums are primarily designed to imprison their inhabitants. So, any resulting videography merely allows one to witness stressed out natural organisms in a manner similar to a poorly run zoo. These conventional systems offer no outdoor space for native species to feed, breed and live. There is no freedom for the inhabitants of these kinds of systems. Nothing natural is occurring. The water contained in the system is usually reprocessed and pumped into the same environment over and over again. This is in stark contrast to the ultra-efficient way that natural systems function, whereby a fresh source of water is continuously being added and flowing through the environment, transporting water impurities into downstream nitrogen-enriched fertile soil.

SUMMARY

This document concerns a modular habitat structure (MHS) for accommodating one or more live inhabitants, such as frogs or other small creatures. The MHS structure is comprised of a rigid pillar which extends linearly away from a base end toward an upper end of the system. A plurality of major system components are disposed at different locations along a length of the rigid pillar. Each of the major system components can be comprised of one or more segments which individually extend circumferentially around at least a portion of the rigid pillar. Each of the segments has a modular configuration, whereby the MHS is user adjustable to a plurality of different configurations by selectively adding or removing one or more segments of each of the major system components. Consequently, a user can circumferentially vary an extent of each of the major system components around a periphery of the rigid pillar in accordance with a user preference.

The major system components can include a retention cabinet system, wherein each segment of the retention cabinet system is individually comprised of a retention well in the form of a bowl. In some scenarios, the retention wells can include at least one overflow slot which is configured to align with an overflow slot of an adjacent one of the plurality of retention wells to facilitate communication of fluid between the plurality of retention wells.

The major system components can further comprise a canopy structure, wherein each of the one or more segments of the canopy structure extend radially outward from the central pillar. Each canopy segment will include an upper surface and a lower surface opposed from the upper surface. The upper surface of the canopy is advantageously comprised of a plurality of ridges which define a shallow pattern of water retention pools in the face of the upper surface which facilitate water retention on the upper surface. The upper surface of each segment of the canopy is also advantageously tapered to facilitate a flow of fluid in a radial direction away from the central axis.

At least one wall stud is provided which has an elongated length and extends from a floor of the bowl defined by the retention cabinet, to the lower surface of the canopy which is opposed from an open face of each bowl. The one or more wall studs can each include attaching members which are arranged in a predetermined pattern along the length of the wall stud. The pattern of the attaching members is configured to align with a pattern of corresponding attachment members provided on at least one customization module. In some scenarios, the attaching members and the corresponding attachment members are magnetic elements which are magnetically attracted to one another so as to secure the customization modules on the wall stud.

The major system components can further comprise a utility cabinet. The utility cabinet is disposed adjacent to the canopy structure along the length of the central pillar. Each of the one or more segments of the utility cabinet extend radially outward from the rigid pillar. The utility cabinet will house one or more of a fluid cistern, a spray nozzle, a battery, photovoltaic panel, and a charge control system for the battery.

The major system components can further comprise a moat assembly. The moat assembly includes one or more flow channels at varying elevations to facilitate a flow of water from a flow channel at a highest elevation to a flow channel at a lowest elevation. The moat assembly is advantageously disposed at a base end of the rigid pillar at a location adjacent to the retention cabinet. According to one aspect the moat assembly can include one or more pass-through chutes. These chutes are configured to facilitate the autonomous movement of MHS inhabitants from an upward facing side of the moat assembly to an opposing downward facing side of the moat assembly.

In the MHS described herein, the one or more segments which comprise the major system components are advantageously secured on the rigid pillar by an opposing pair of docking plates. Each pair of docking plates is coaxially disposed on the rigid pillar, spaced apart on opposing sides of the segment which abuts the rigid pillar. In some scenarios, a first one of the major system components is spaced apart along the length of the rigid pillar from a second one of the major system components by a core ring which is coaxially disposed on the rigid pillar. Further, one or more of the docking plates and/or the core rings can comprise at least one index structure. The index structure is configured to interact with a corresponding index structure of a segment to facilitate an alignment along the length of the rigid pillar of a first one of the segments to a second one of the segments.

The MHS will also advantageously comprise an electronic control unit. The electronic control unit can be an electronic processing unit (e.g., a microcontroller or a CPU) which is configured to control one or more accessory devices integrated into the MHS. As such, the control unit can facilitate selective monitoring and control of the MHS environment. The one or more accessory devices integrated into the MHS can be selected from the group consisting of a lighting element, an electronic camera, a microphone, a loud speaker, a sensor, a fan, a thermostat, and a heating element.

According to one aspect, a lower surface of the segments which form the canopy structure can include one or more accessory sockets. These accessory sockets are configured to provide at least one of power and data to one or more of the accessory devices installed therein. Each of the accessory sockets is configured to receive a plug associated with a particular one of the accessories. The accessory sockets and plugs can be comprised of any type of plug and socket arrangement that is now known or known in the future. For example, in some scenarios the plug and socket arrangement can be based on the well-known standard established for Universal Serial Bus (USB) ports.

The one or more accessory devices can also include at least one water pump. The water pump in such scenarios is advantageously configured to urge a flow of water from at least one water storage container integrated into the MHS, to one or more flow nozzles integrated in one or more of the major system components. For example, the flow nozzles associated with one or more of the major system components can be coupled to the water pump through one or more hose couplings disposed on the outer periphery of the rigid pillar. These hose couplings are arranged on the rigid pillar at selected locations which correspond to the locations of hose fittings which are disposed on an abutting wall of the segments when installed. Consequently, a fluid connection to one or more of the segments can be automatically established when the segment is installed on the rigid pillar. The flow nozzles are disposed in one or more locations of the MHS. For example, these locations can include the canopy structure and one or more customization modules that are configured to house inhabitants of the MHS.

In the MHS described herein, at least one latching element can be provided for each segment. The latching element(s) is/are configured to secure a first segment to a circumferentially adjacent second segment. Any suitable type of latching element can be used for this purpose. However, in some scenarios, it can be advantageous to configure the latching element to include an elastic strap extending between lugs on the first and second segment.

The rigid pillar can be comprised of at least one internal conduit channel in which at least one fluid conduit is disposed. The fluid conduit can extend through the pillar to carry water from the pump to at least one fluid port (e.g., a hose coupling) which facilitates a flow of water to a flow nozzle. The internal conduit channel can also advantageously contain at least a portion of a wire harness. The wire harness in such scenarios can be configured for communicating at least one of power and data for at least one electronic device (e.g., an accessory device) integrated with the MHS. The wire harness can also facilitate control of such accessory device by the electronic control unit.

BRIEF DESCRIPTION OF THE DRAWINGS

This disclosure is facilitated by reference to the following drawing figures, in which like numerals represent like items throughout the figures, and in which:

FIG. 12A is a partially exploded perspective view of the MHS in FIG. 1 which some of the segments of major system components are removed to facilitate an understanding of how an MHS is assembled;

FIG. 12B is a perspective view of a portion of the MHS in FIG. 12A;

DETAILED DESCRIPTION

Figure 1:
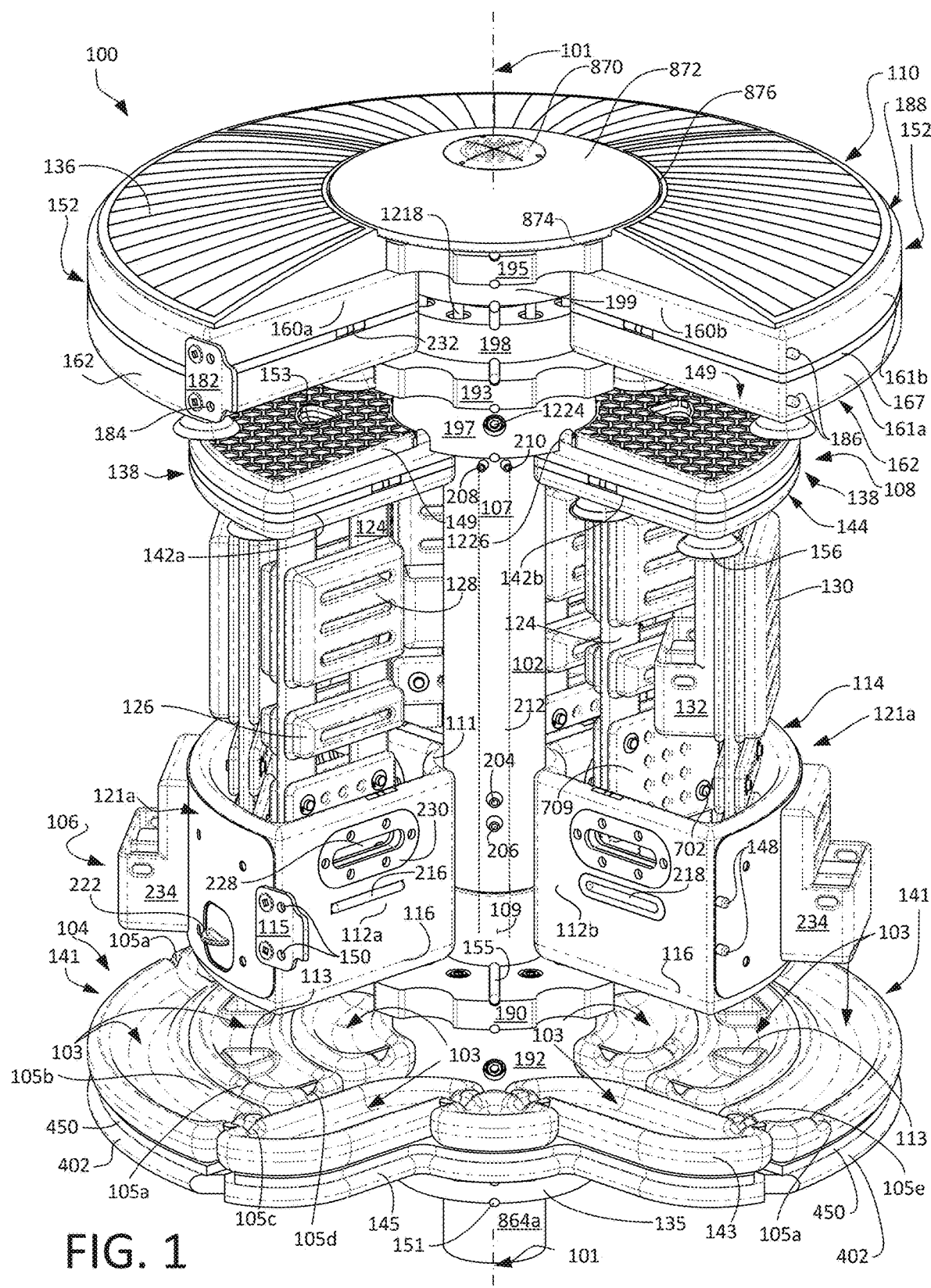
FIG. 1 is an upper front perspective view of a modular habitat system (MHS) that is useful for understanding a solution disclosed herein.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

A solution is presented herein for a modular habitat system (MHS) which is easily assembled and disassembled by a user. The arrangement of the MHS is such that it facilitates utilization of off-grid water and power source(s), thereby liberating the nature hobbyist to set up the system anywhere they see fit. The structure of the MHS is comprised of materials that are weather-resistant such that the system can be used indoors or outdoors. The design is advantageously configured to facilitate observation of organisms living therein while facilitating a suitable living space. A further advantage of the solution is that it is designed to biomimic a natural environment. As used herein, the term "biomimic" refers to the design and production of materials, structures, and systems that are modeled on biological entities and processes. The system is particularly well suited for amphibian wildlife.

Biomimic design strategies incorporated in the system deliver an off-grid ultra-efficient: water, soil and creature-specific living space structure. Rainwater harvesting, pumping, and flow control structures are integrated into the design. This arrangement facilitates a constant interchange of source water among the various bio-constituents of the system. The constant flow of water is used to slowly hydrate flora and fauna which are sustained by the system. According to one aspect, the operation of the entire system can be controlled and monitored by a computing device, such as a smartphone, tablet, laptop or desktop computer.

The habitat structure is comprised of a rigid material which may include various types of polymers and/or composite materials. In some scenarios, natural material can also be used to facilitate the construction of the structure. If a polymer or composite material is used, the material can be biologically-tested for safety with respect to MHS inhabitants. The material can be color-coordinated for a pleasing humanistic aesthetic or camouflaged to blend in to its natural environment. The material may be comprised of a recycled plastic to facilitate a positive environmental impact. In some scenarios, easily regenerated, ecologically-treated bamboo is another material of choice.

Observation of flora and fauna within the MHS can be advantageously facilitated by the use of high quality surveillance-like video camera technology. The incorporation of video imaging technology in the system allows the use of glass or transparent plastic to be minimized since the inhabitants of the MHS can be showcased using the cameras. In exchange for its transparency, there are many negative aspects to the use of glass for creating a biomimicking natural environment of the kind described herein. Glass inherently provides little to no privacy for living inhabitants of the system and is easily smudged or fogged over. In transit, it is easily broken and then extremely dangerous to all involved.

Taken together, the solution includes many features and advantages. For example, it provides:

Food, water and a breeding area to a chosen amount of native nature-space

A biomimic core design strategy equating to low-maintenance and good health for inhabitants Off-grid operability to facilitate installation and utilization anywhere A smartphone command-control capability that allows users to more easily maintain and enjoy the creatures and inhabitants in the MHS A modular structural configuration that allows for easy assembly and inclusion of modular components for customization to local inhabitants A calming live video feed of nature events onto virtually any size display screen A balanced ecosystem when a sufficient number of units are in use A mutually beneficial direct connection between nature and mankind The foregoing features and advantages are facilitated by a novel design of the MHS which includes a rigid central pillar or anchor pole which serves as the system's structurally sound backbone. In some scenarios, the pillar can be provided with certain components that facilitate adjustment to its orientation for ensuring that it is precisely vertical when initially installed and after the unit settles in place. Further, one or more structural core-rings are provided, and axially aligned with the anchor pole. These core rings, in conjunction with docking-plates, are important building blocks of the MHS structure insofar as they facilitate easy assembly and disassembly when needed. The core rings also allow users to customize the MHS with certain MHS system components by selectively attaching and/or detaching such components to the pillar. In some scenarios, the docking plates and certain core rings can include indexing structures and latching elements to ensure that these optional elements are properly aligned with each other on the pillar. One purpose of the indexing structure is to vertically align certain bolt holes which receive elongated bolts. Such vertical alignment of the bolt holes can facilitate easy assembly and disassembly of the MHS structure. According to one aspect, the latching elements can be magnetic latches to further facilitate ease of assembly and disassembly.

Water nozzles are strategically positioned at certain locations within the MHS to help flush inhabitant waste outwards while hydroponically irrigating and fertilizing nearby plants. The structures and surfaces of the MHS are designed to facilitate a gravity induced downward and meandering outward flow of irrigation water. This flow is facilitated in part by the use of notched moat-pieces and associated moat-mats which create a stepped arrangement. Further, the moat pieces are disposed on a platform structure of which an upper and lower moat platform-piece connector plate may be used to easily expand and structurally enhance this rigid moat platform-structure. The platform pieces are advantageously sandwiched and clamped between the core rings and docking station. This arrangement provides a significant benefit insofar as it adds to the structural soundness at the core of the MHS system.

Another feature of the MHS is the use of wall studs and interchangeable customization-modules. Different types and configurations of customization modules can be installed on the wall studs to facilitate a variety of different functions. For example, the various different types of customization modules can be designed as secure accommodations and/or living spaces for various different types of small, native wildlife, such as frogs. The customization modules are designed so that they can be easily installed and removed within the system for convenient servicing when needed. The system can further include one or more feed husbandry units which are configured to facilitate the growing of inhabitant-specific food.

An accessory canopy is provided to facilitate installation of lighting and other electronic accessories. For example, the lighting can include insect-attracting lights which support inhabitant predation. Other lighting can include an interactive, diffusible, and/or multicolor LED light(s) for creating a pleasing aesthetic effect. In some scenarios, an electrifiable mesh-like curtain can be provided around the periphery of the system to protect against intrusion by destructive predators.

The solution, which is described below in greater detail, overcomes numerous problems associated with conventional vivariums and artificial habitats. As such, it is of value to nature hobbyists, caring parents, green entrepreneurs, biology teachers, gardeners, gazebo enthusiasts, teenage garners, vivarium: zoologists, herpetologists & botanists and many others.

Figure 2:
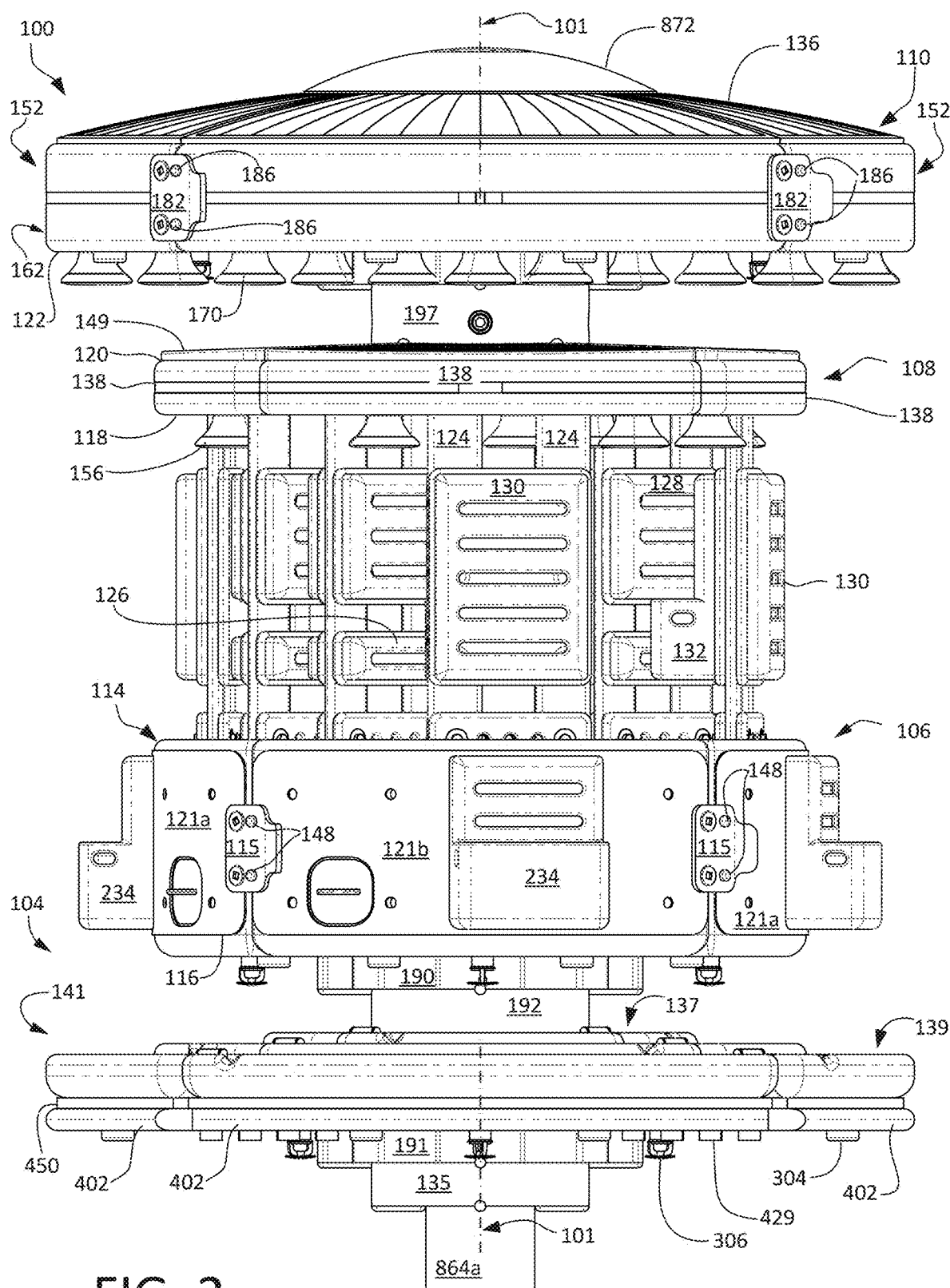
FIG. 2 is a rear elevation view of the MHS in FIG. 1.
Figure 3:
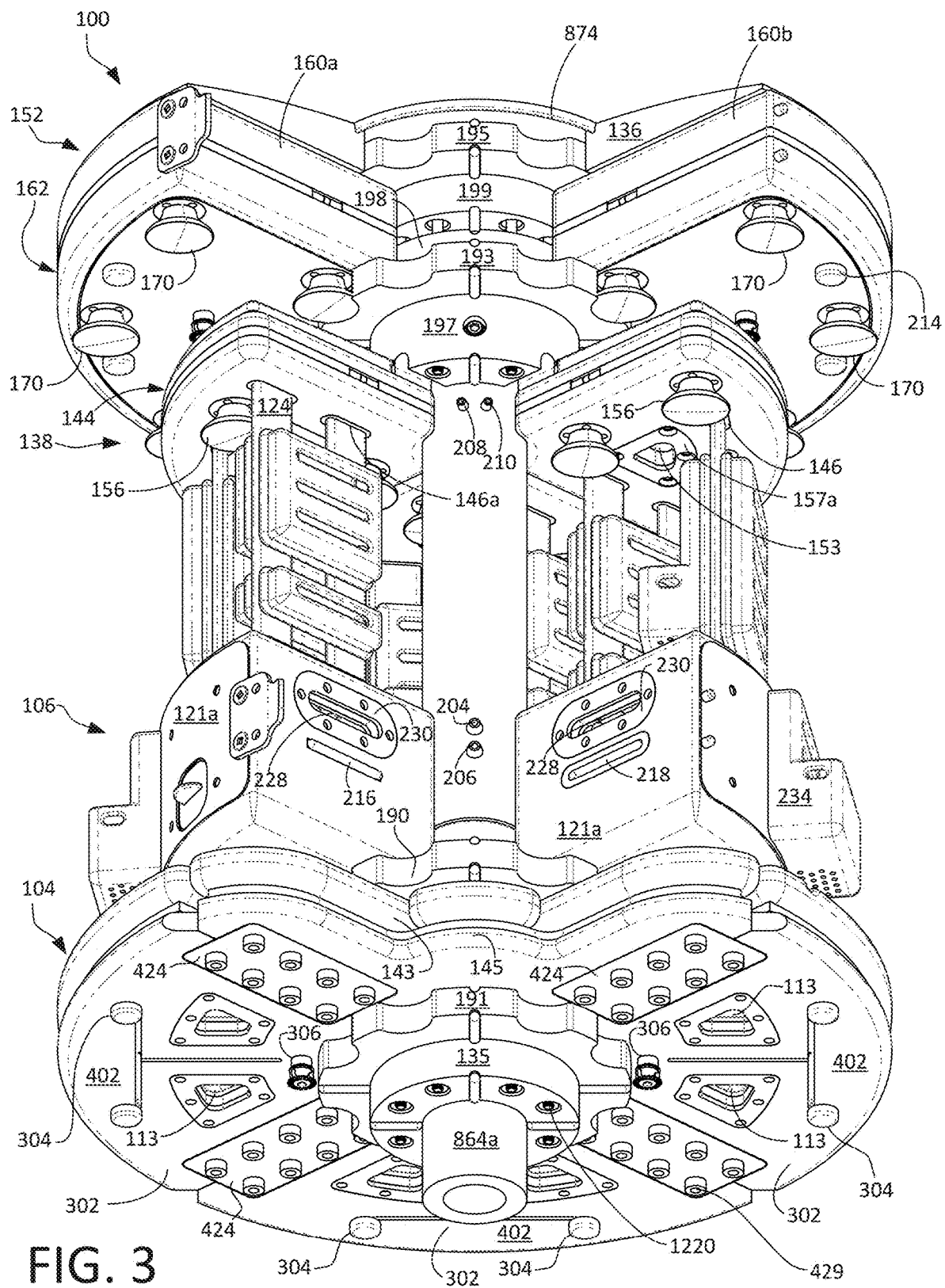
FIG. 3 is a lower front perspective view of the MHS in FIG. 1.

An example of a Modular Habitat System (MHS) 100 is illustrated in FIGS. 1-3. The system as shown is useful for understanding certain aspects of a solution presented herein. However, it should be appreciated that the modular nature of the MHS is such that many other configurations of the MHS are possible. These alternative configurations will be noted as the discussion progresses. Still, the particular arrangement shown in FIGS. 1-3 is useful for purposes of understanding a basic design of the MHS structure and many of the modular features.

Major System Components of the MHS

As shown in FIGS. 1-3, the MHS 100 is comprised of a rigid central pillar 102 which serves as a main structural member upon which various major system components are supported or mounted. An elongated length of the central pillar is aligned along a central axis 101. Major system components which are mounted on the central pillar include a moat assembly 104, a retention cabinet system 106, a canopy structure 108, and a utility cabinet 110. These major system components are supported and aligned on the central pillar by a system of core rings and docking plates which are described below in greater detail. Each of the major system components has a modular construction, comprised of one or more modular wedges or segments which extend circumferentially around at least a portion of the rigid pillar 102. The arrangement permits a user to expand the system radially around the central pillar 102 by adding segments to each of the major system components.

The central pillar 102 can include at least one internal bore 212 which extends along its elongated length. The internal bore 212 provides a space through which conduits for a fluid (such as water), wire harnesses for electrical power and/or electronic signals, and/or optical fibers can be routed throughout the MHS while remaining hidden from view. At appropriate locations along the length of the central pillar 102, there are provided quick attach/detach coupling ports 204, 206, 208, 210. These coupling ports are provided to facilitate communication of water, electrical power, and/or data signals among the major system components such as the moat assembly 104, retention cabinet system 106, canopy structure 108, and a utility cabinet 110.

Figure 5:
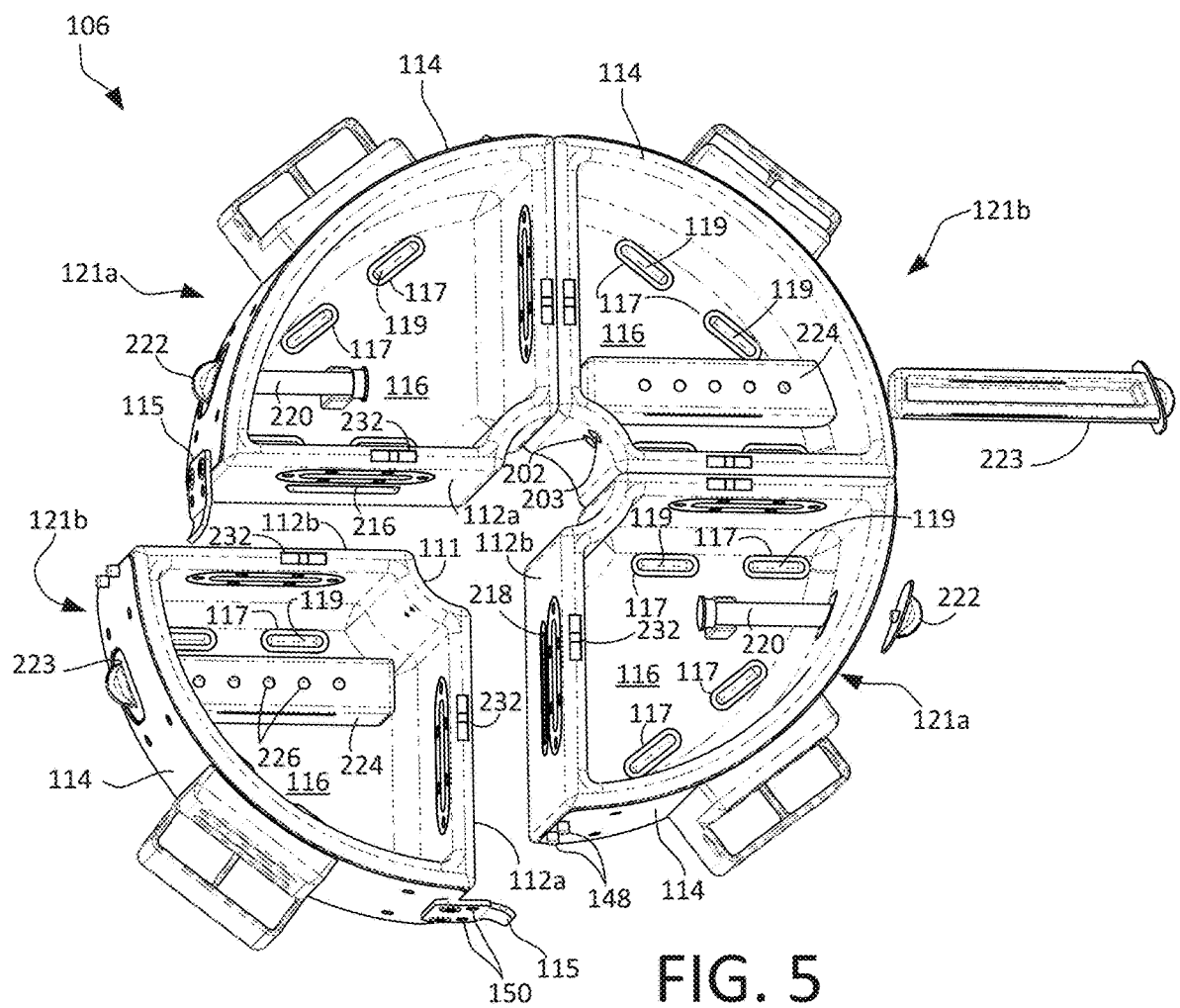
FIG. 5 is a drawing that is useful for understanding a retention cabinet system which can be used in the MHS.

The coupling ports 204, 206, 208, 210 can be arranged at periodic intervals around the perimeter of the central pillar so that they are disposed at predetermined alignment angles. Corresponding quick attach/detach couplings can be provided on an abutting inner wall of one or more segments associated with these major system components. An example of such corresponding couplings would include couplings 202, 203 which are shown in FIG. 5. Accordingly, when the appropriate segment is properly aligned on the pillar, the couplings on a particular segment can be mated with the couplings 204, 206, 208, 210 of the pillar. In this way, water, electrical power, electronic signals and/or optical signal connections can be facilitated in a manner that facilitates a simple modular MHS construction and assembly, without the negative aspects of visually exposed wires and conduits.

Radially Expandable Architecture

Figure 10:
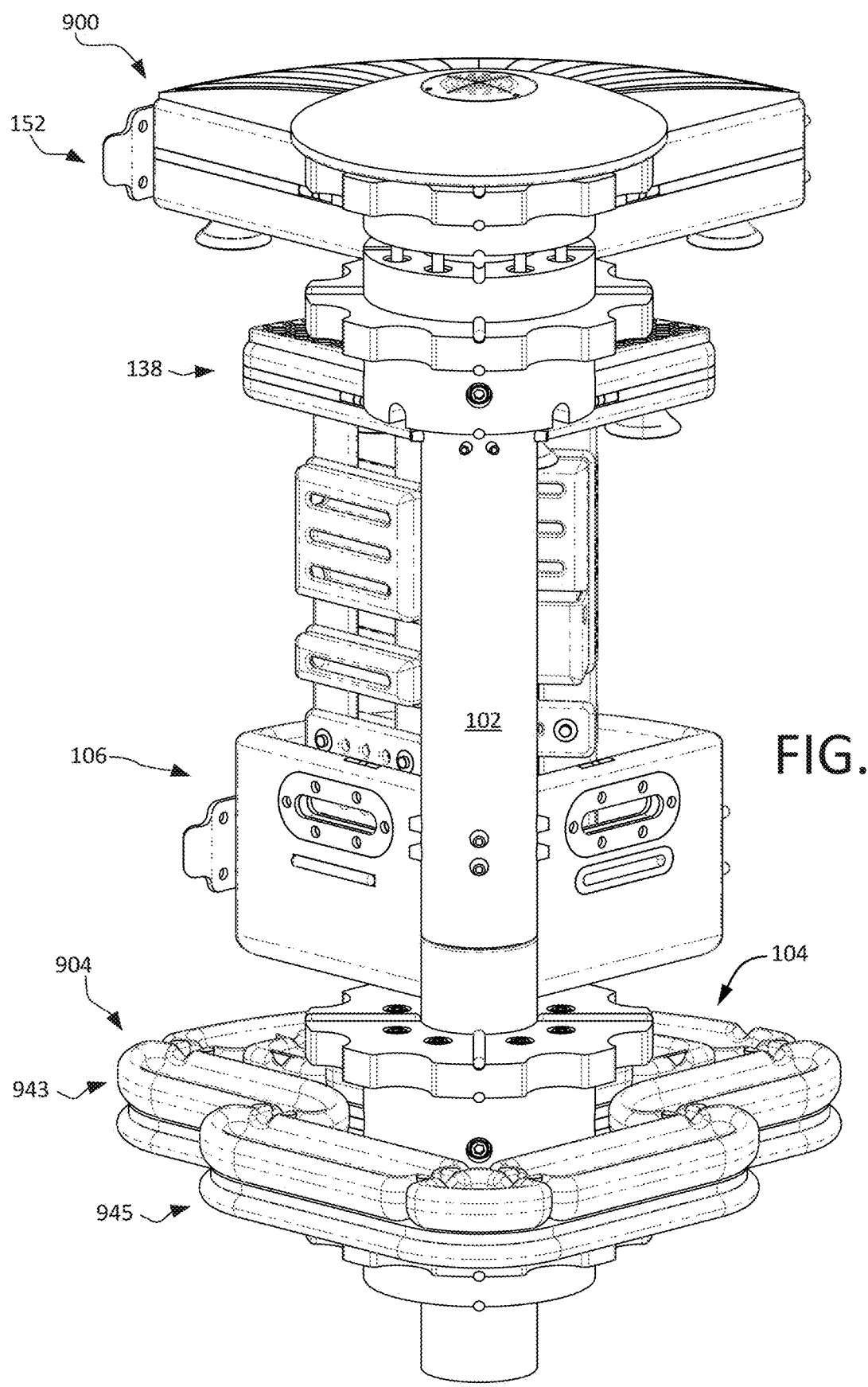
FIG. 10 is a drawing that is useful for understanding a second alternative configuration of the MHS.

As noted above, each of the wedges or segments which comprise the major system components 104, 106, 108, 110 can extend through a predetermined angle around the rigid pillar 102. Consequently, the MHS can be expanded by adding segments to major system components. In some scenarios the segments which comprise several of the major system components 104, 106, 108, 110 which comprise the MHS 100 can each be configured to extend 90° around the central pillar 102. Accordingly, by using only one segment for each such major system component, a 1/4 circle configuration can be obtained. For comparison purposes, a 1/4 circle configuration MHS is shown in FIG. 10.

Figure 9:
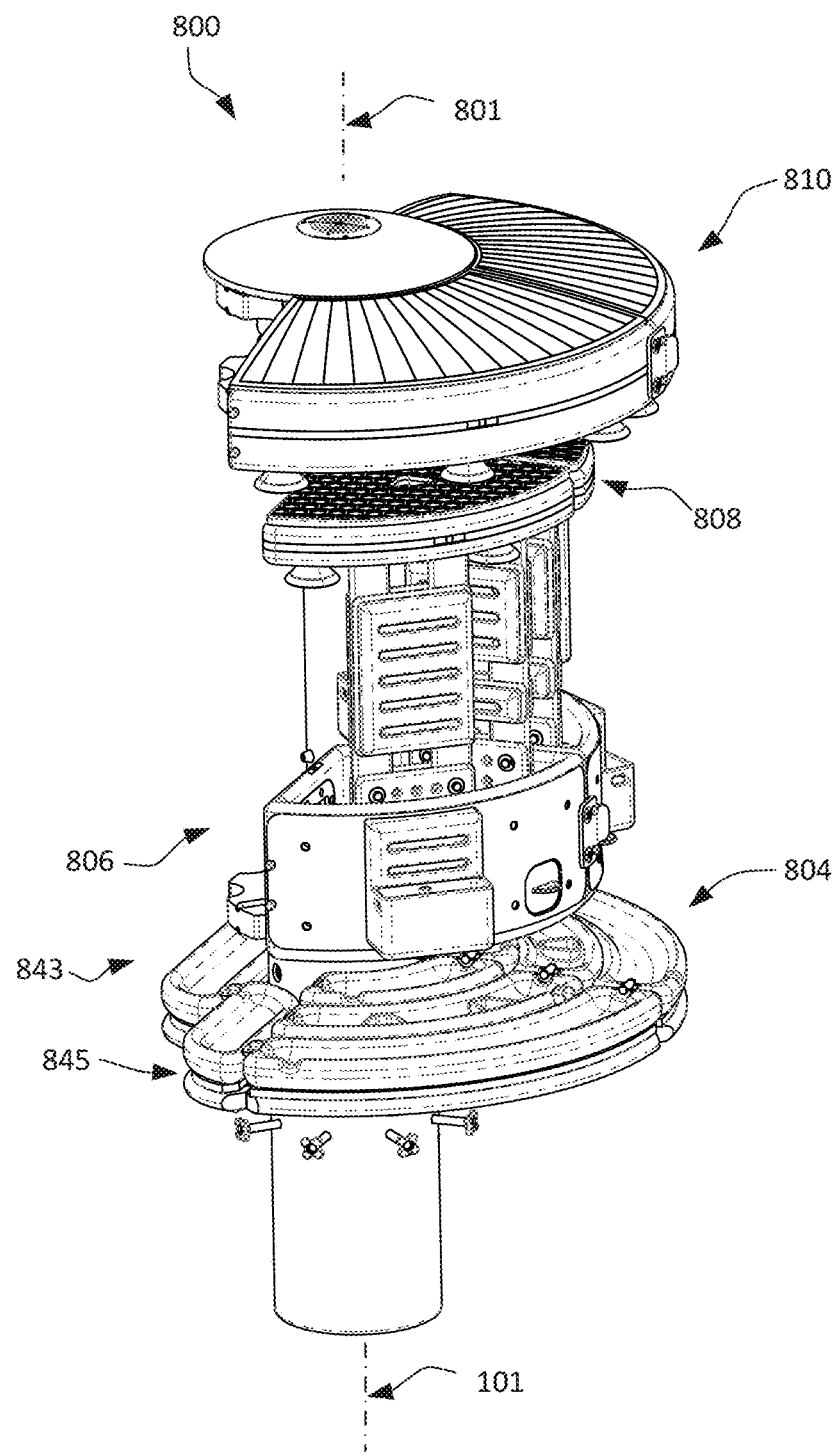
FIG. 9 is a drawing that is useful for understanding a first alternative configuration of the MHS.

In other scenarios, several of the major system components 104, 106, 108, 110 which comprise the MHS 100 can each be configured to extend 180° around the central pillar 102 by using two 90° segments for each such major system component. Such an arrangement is sometimes referred to herein as a 2/4 circle configuration. For comparison purposes, a 2/4 circle configuration MHS is shown in FIG. 9. In the system shown in FIGS. 1-3, the major system components 104, 106, 108, 110 are each configured to extend 270° around the central pillar 102 by using three 90° segments or wedges for each such major system component. Such an arrangement is sometimes referred to herein as a 3/4 circle configuration. Similarly, a full 4/4 circle configuration which extends 360° around the central pillar would require four of the 90° segments.

Of course, the segments or wedges which comprise each of the major components do not need to extend 90° around the central pillar. Each wedge could extend a greater or lesser angle around the central pillar. In such scenarios a greater or lesser number of segments or wedges may be utilized to achieve a desired MHS configuration. The MHS in such scenarios would not be limited to the particular 1/4, 2/4, or 3/4 configurations described above.

In many instances it can be advantageous to configure each of the major system components 104, 106, 108, 110 in a particular MHS configuration to have an equal number of segments. But the solution is not limited in this respect and there can be configurations in which an unequal number of segments are used to instantiate one or more of these major system components. In some scenarios, the moat assembly 104 can be comprised of an equal number of segments as compared to the other major system components 106, 108, 110. However, in other scenarios the arrangement of the moat assembly 104 can be a special case such that it may comprise a different number of segments as compared to the remainder of the major system components. From the foregoing, it will be understood that the wedge system of radial expansion offers great system versatility for a wide variety of configurations and installation locations. Additional details of the MHS system will become more apparent from the more detailed description below.

Core Ring/Docking Plates

It can be observed in FIGS. 1-3 that the MHS structure is built around a central pillar 102 which serves as the structural core of the MHS system. Strategically positioned along the length of the central pillar and between several of the major components are a plurality of core rings (e.g., core rings 135, 192, 197, 198, 199), and a plurality of docking plates 190, 191, 193, 195. These core rings and docking plates are utilized to achieve maximum structural integrity for the MHS structure. The use of core rings and docking plates also facilitates a modular architecture for the MHS that allows for easy assembly and disassembly of the system by a user. The way that the core rings and docking plates function in the MHS is described below in further detail in FIGS. 12A-12C in relation to the discussion of the modular MHS architecture and assembly.

Detailed Description of Major System Components

Moat Assembly

The major system component at the lowest portion of the MHS 100 is the moat assembly 104. As shown in FIGS. 1-3, the moat assembly 104 can be comprised of a plurality of modular moat pieces 141, each of which is supported on a corresponding portion of a moat platform segment 402. One or more moat mats 450 can be disposed between the platform segment 402 and the modular moat pieces to vary a relative elevation of the moat pieces. As shown in the figures, the modular moat pieces 141 define a series of meandering flow channels 103. The flow channels 103 receive a fluid, such as water, from one or more of the system components at higher elevations of the MHS 100. The flow channels 103 can be arranged at stepped elevations, ranging from highest to lowest. The stepped elevations are such that a fluid, such as water, can flow downwardly from flow channels 103 which are located at an uppermost zone 137 of the moat assembly having a highest elevation, to flow channels 103 at progressively lower elevations 139.

As may be observed in FIGS. 1-3, the moat platform segments 402 can be disposed on a first docking plate 191. The moat platform segments are secured between the docking plate 191, core ring 135 structure on the bottom and a second core ring 192, docking plate 190 structure on top. A rigid core ring 192 (which can be somewhat thicker in the axial dimension as compared to core ring 198) spaces the second docking plate from the moat platforms and adds to the structural integrity of the MHS. A series of elongated threaded bolts (not shown in FIGS. 1-3), arranged in a pattern around the central pillar 102, can extend through docking plate 190, core ring 192, proceeding through the moat platform segment's bolt holes 404, through the sub-cabinet docking plate 191, core ring 135 combined structure and into threaded captive nuts 1220 embedded in a bottom plane of core ring 135 so as to secure the assembly together.

Figure 4B:
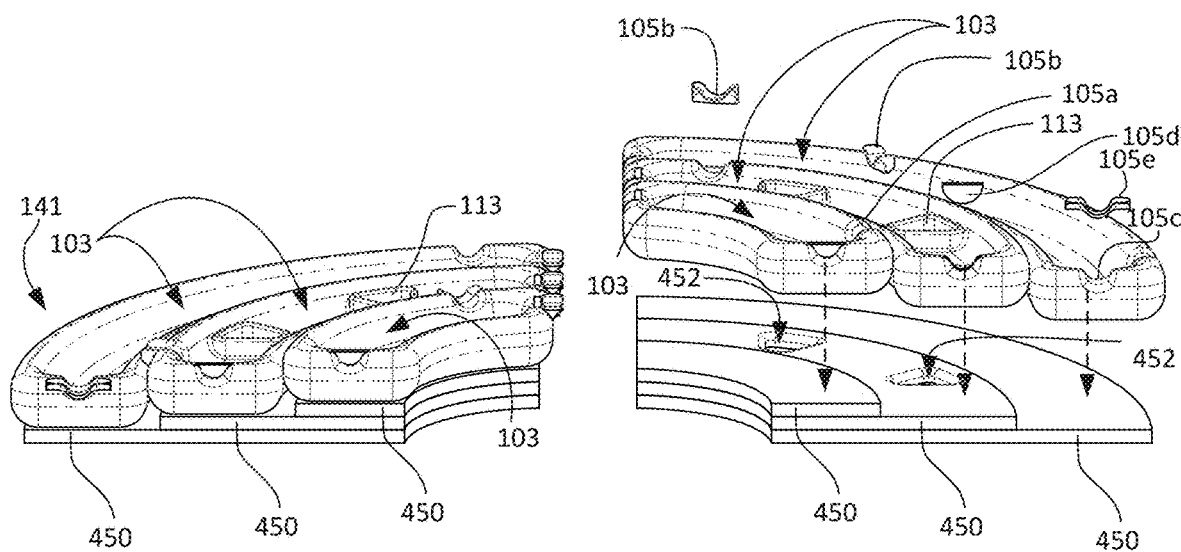
FIGS. 4A and 4B are a series of drawings which are useful for understanding a modular moat system which can be used in the MHS.
Figure 4A:
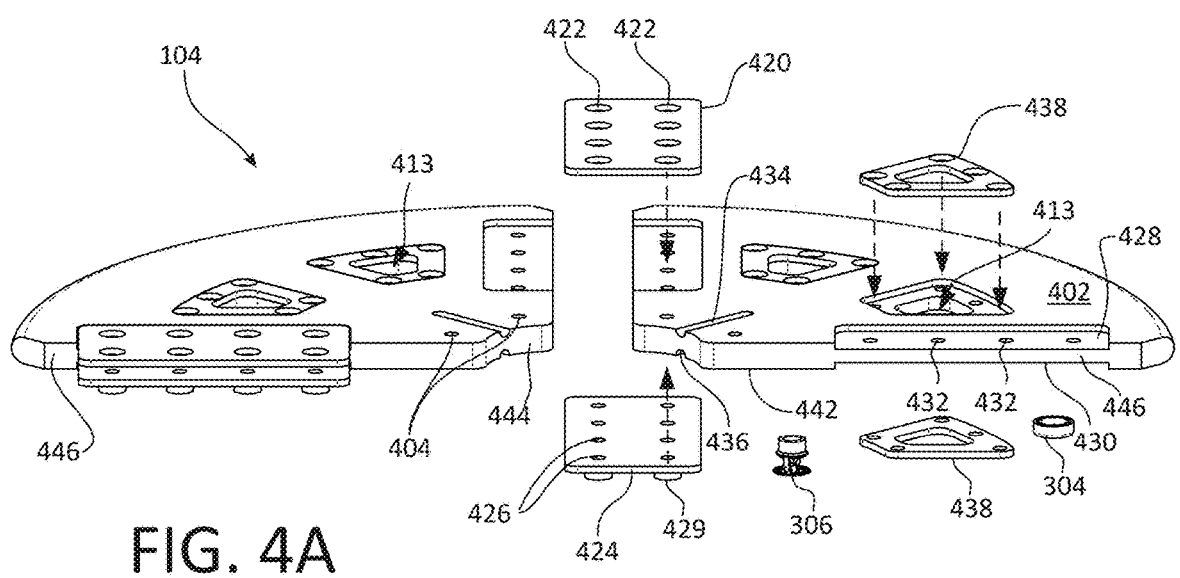

As may be understood with reference to FIGS. 3 and 4A, each moat platform segment 402 is comprised of a rigid arcuate element having side walls 446, and a curved outer peripheral wall 448. Adjacent moat platform segment 402 can be secured together along their side walls using upper and lower platform segment connector plates 420, 424. To facilitate such connections, each moat platform segment 402 can have an upper and lower recess 428, 430 which are sized and shaped for receiving a portion of the moat platform segment 402. The moat platform segment 402 and the moat platform segment connector plates can be formed with one or more apertures 422, 426, 432. The apertures can be aligned in a predetermined pattern to receive therein suitable fasteners to secure the connector plates to the moat platform segment. For example, in some scenarios, the apertures can be configured to receive threaded fasteners which are received in captive nuts 429. Other suitable fastening arrangements are also contemplated.

One or more chutes 413 are provided in the moat platform segment 402. The chutes 413 extend from an upper surface 440 of the moat platform segment to a lower surface 442. The chutes 413 are passageways extending through the moat platform segment and are sized so that inhabitants of the MHS 100 can have a convenient point of ingress and egress to the moat assembly. Chute protection plates 438 can extend around the opening of each chute. The chutes 413 are vertically aligned with corresponding chutes 113 disposed on the moat pieces 141 and in moat mats 450. The chutes allow inhabitants of the MHS to easily transition through the moat platform.

Each moat platform segment will have an inner abutment wall 444 which abuts snugly against the outer periphery of pillar 102 when the moat platform segment is installed in the MHS. Each moat platform segment 402 can also include alignment structures 434, 436. The alignment structure 434, 436 can in some scenarios comprise a channel which extends radially outward from the inner abutment wall 444. The alignment structure, 436 ensures a proper alignment of the moat platform segment's bottom side on the docking plate 191. The alignment structure 436 is advantageously sized and shaped to receive a corresponding alignment structure 155 (also shown as 1206 on FIG. 12C) which is disposed on the docking plate 191. The alignment structure 434 is advantageously sized and shaped to receive a corresponding alignment structure 151 (also shown as 1207 on FIG. 12C) which is disposed on the bottom side of rigid core ring 192.

In a scenario shown in FIGS. 1-3, an uppermost zone 137 of the moat assembly 104 having flow channels 103 with a highest elevation, can be disposed closest to the central axis 101. The lowermost zone 139 can comprise those flow channels at the outer periphery of the moat assembly which are furthest from the central axis 101. Of course, the solution is not limited in this regard and other flow configurations are also contemplated within the scope of the solution presented herein. Notches 105a, 105c formed in side walls of downward/outward and/or lateral flow channels can facilitate a flow of water from the flow channels 103 at higher elevations to those flow channels at lower elevations. Downward water flow occurs when water spills over an overflow notch 105a, over an inflow-gasket 105b, filling up the directly below moat piece flow channel 103. Lateral flow is possible by easily removing a lateral flow plug-tab 105d, where it now overflows the lateral-flow inflow-gasket 105e and into the adjoining lateral flow channel 103. Eventually, the 105a notches can also allow excess fluid to flow out of the moat assembly onto the underlying ground.

To facilitate the different elevations of the flow channels described herein, one or more of the modular moat pieces 141 can be disposed on one or moat mats 450. The moat mats 450 can be comprised of modular arcuate segments in a manner similar to the modular moat pieces 141 and the moat platform segments 402. One or more moat mats can be used to create a stepped configuration as shown in FIG. 4B. The moat mats can include chutes 452 which are aligned with chutes 413 in the moat platform segments. The chutes 413 are aligned with moat piece assembly chutes 113. In some scenarios, the moat mats can be formed of an antimicrobial material to minimize the growth of microbes.

As will be understood from the foregoing, the moat platform segments 402, the moat mats 450, and the modular moat pieces 141 can be configured to extend circumferentially around at least a portion of the rigid pillar 102. As such, one or more of these elements can have a substantially wedge-like shape as shown. In a scenario shown in FIGS. 1-3, each of three modular moat pieces 141, moat mats 450, and moat platform segments 402 can respectively extend around the central axis 101 through an arc of approximately 90°.

At least one additional modular moat piece, moat mat and corresponding moat platform segment can be provided so that the moat assembly 104 will extend 360° around the pillar 102. In some scenarios, the additional moat piece(s), moat mats, and moat platform segments can be basically the same configuration as moat pieces 141, moat mats 450, moat platform segments 402. In other scenarios, the at least one additional modular moat piece, moat mat and moat platform segment can have a somewhat different configuration. Such a moat piece is sometimes referred to herein as a nonconforming moat piece. For example, a non-conforming moat piece 143 and moat platform segment 145 can be used for this purpose as shown in FIG. 1. These non-conforming elements can be advantageously sized and configured for aesthetic appeal, but also function to help balance a weight distribution of the moat assembly on the central pillar 102.

Other configurations of the moat assembly 104 are also possible. For example, in FIG. 9, a moat assembly 804 can include only two each of the 90° modular moat pieces 141 and moat platform segments 402 to achieve a 2/4 circle MHS configuration 800. In other scenarios, only one each of a 90° modular moat piece 141/moat platform segment 402 can be used to facilitate a 1/4 circle MHS configuration 900 (e.g., as shown in FIG. 10) for a moat assembly 904. In such scenarios, non-conforming moat pieces 843, 943 and associated moat platform segments 845, 945 can optionally be provided so that the moat assembly extends completely around the central pillar 102.

It should be noted that a standard modular moat piece 141 and associated platform segment 402 can extend through an angle around the central axis which is smaller or larger than 90°. In such scenarios, a greater or lesser number of such modular moat pieces and associated moat platform segments may be provided to extend through a predetermined angle around the pillar 102. The number of modular moat pieces 141, and moat platform segments 402 that are included in a particular configuration of the MHS 100 can be selected in accordance with a user preference.

In some scenarios, the standard and/or moat platform segments can be provided with one or more functional features disposed on an underside surface. For example, in the case of a moat platform segment 402, these functional features can include lighting elements 304 and spray nozzles 306 disposed on an underside surface 302. In some scenarios, the lighting elements can be LED lamps equipped with suitable light diffusers. However, other types of lighting elements can also be used for this purpose. The function of these lighting elements 304 is to attract insects as live feedstock for the inhabitants of the MHS 100. As such, the color of the lighting elements can be chosen to most efficiently facilitate such insect attraction feature.

Retention Cabinet System

Referring again to FIGS. 1-3, it can be observed that the retention cabinet system 106 is comprised of one or more retention wells 121a, 121b disposed above the moat assembly at a lower end 109 of the central pillar 102. The retention wells can be of one or more different types, as indicated by reference numbers 121a, 121b. The purpose of these different types of retention wells will be explained in further detail below. However, each type of retention well 121a, 121b can be configured as a wedge-shaped bowl which extends circumferentially around at least a portion of the rigid pillar 102. In the scenario shown in FIGS. 1-3, and 5, each of three retention wells respectively extends through an arc of approximately 90° around the central pillar. However, a fourth retention well 121a, 121b could be added as shown in FIG. 5 so that the retention wells would extend a total of 360° around the pillar 102. Other configurations are also possible. For example, in some scenarios, only one or two of the retention wells 121a, 121b can be provided. A particular configuration of an MHS 100 can include more or fewer of such retention wells in accordance with a user preference.

Each of the retention wells 121a, 121b are comprised of a floor 116, side walls 112a, 112b, an inner wall 111 which abuts the central pillar 102, and an outer peripheral wall 114. In some scenarios, an exterior surface of the inner wall 111 is advantageously contoured to form an arc so as to fit snugly around the central pillar 102 as shown. The side walls 112a, 112b of each retention well extend outwardly away from the central axis 101 and inner wall 111, toward the peripheral wall 114. The peripheral wall in each instance can have a curved or arcuate shape as shown and is spaced apart from the inner wall by a predetermined distance.

The side walls 112a, 112b include pass-through/overflow ports 228. These ports allow a fluid, such as water, to flow between two or more bowls defined by the adjacent retention wells so that fluid levels can be equalized. The ports can include flow prevention plates 230 which can transition between an open and closed position. The flow prevention plates permit the user to selectively control whether water will be permitted to pass through the ports 228. The flow prevention plates 230 also are useful for permitting or denying inhabitants of the MHS the ability to ingress/egress through the openings.

Embedded on side walls 112a of each retention well is a first magnetic element 216. Embedded on an opposing side wall 112b of each retention well is a second magnetic element 218. In some scenarios, the configuration of the second magnetic element can comprise a recess or receptacle. The receptacle will advantageously have a size and shape this is configured to snugly receive the first magnetic element 216 of an adjacent retention well when the two retention wells are assembled together as shown. The first and second magnetic elements advantageously have opposite polarities such that the first and second magnetic elements are magnetically attracted to each other. Consequently, when two or more of the retention wells 121a, 121b are assembled in a circular configuration as shown in FIGS. 1-3 and 5, the sides of the adjacent retention wells will snap together. This arrangement facilitates ease of assembly and ensures that side walls of adjacent retention wells are in perfect alignment. The side walls can also be equipped with systemwide bubble levels 232 to facilitate quick and convenient leveling of the MHS structure.

The floor 116 of the retention wells 121a, 121b is supported on docking plate 190. As noted above a plurality of indexing structures 155 can be arranged on the surface of each docking plate to align the retention wells 121a, 121b with corresponding indexing structures disposed on the floor of each retention well 121a, 121b. A magnetized female indexing plate may be embedded in the retention well's underside whereby providing the docking plate's male indexing rod a channel to properly align and lock into, magnetically. In such scenarios, both the female indexing-plate and alignment rod can be formed of metal whereby a durable and long-lasting structure is facilitated. At times a core ring indexing structure 151 may be employed to align a core ring to an assembly piece not requiring a docking plate. These small features all add up to creating a structurally sound, long-lasting, easy to assemble/disassemble structure.

Tensioning straps or latches can be used to prevent the retention wells 121a, 121b from becoming dislodged with respect to their position abutting the pillar 102. For example, one or more tensioning straps 115 can be provided which extend between adjacent retention wells. In some scenarios, the tensioning straps 115 can be formed of a resilient or elastic material. Examples of suitable materials for this purpose can include materials such as rubber, elastic polymer or neoprene. At a first end, the tensioning straps are fixed to a portion of a retention well 121a, 121b. For example, as shown in FIG. 5 the tensioning straps 115 can be secured to the outer peripheral wall 114 adjacent to where the peripheral wall intersects with a side wall 112a. The tensioning straps 115 can also include a simple latching structure whereby they can be secured to an adjacent one of the retention wells 121a, 121b. For example, in some scenarios the tensioning straps can include apertures 150. Nubs 148 are provided on an adjacent retention well 121a, 121b. The nubs can be slipped through the apertures when the tensioning strap is stretched to extend between the two retention wells. The elastic material of the tensioning strap 115 will thereafter help to ensure that the tensioning strap remains in place, securing the adjacent retention wells 121a, 121b together and preventing them from becoming dislodged from the pillar 102.

Different types of retention wells can be configured for different functions in the MHS environment. For example, a retention well 121a can be comprised of a watertight bowl in which a pool of water can be retained for the benefit of MHS inhabitants. This type of retention well can advantageously include an integrated drain pipe 220 and a manually operated valve control knob 222. The drain pipe and valve control facilitate periodic drainage of water when needed for cleaning or other reasons. Other types of retention wells can be designed to contain a layer of soil in which worms and/or other live food stock can thrive for the benefit of MHS inhabitants. For example, a retention well 121b can include a feed access drawer 223 which fits snugly within an access shell 224. Worm push-through grommets can provide apertures 226 in the access shell 224. Worms contained in soil surrounding the access shell can therefore push through such apertures 226 and will thereafter be retained in the feed access drawer 223. As such, a user desiring to manually feed inhabitants can extract the access drawer 223 in the direction indicated by the arrow 226 to access the worms contained therein. The MHS is not limited to these specific types of retention wells and other retention wells can be provided without limitation.

Canopy Structure

Figure 6B:
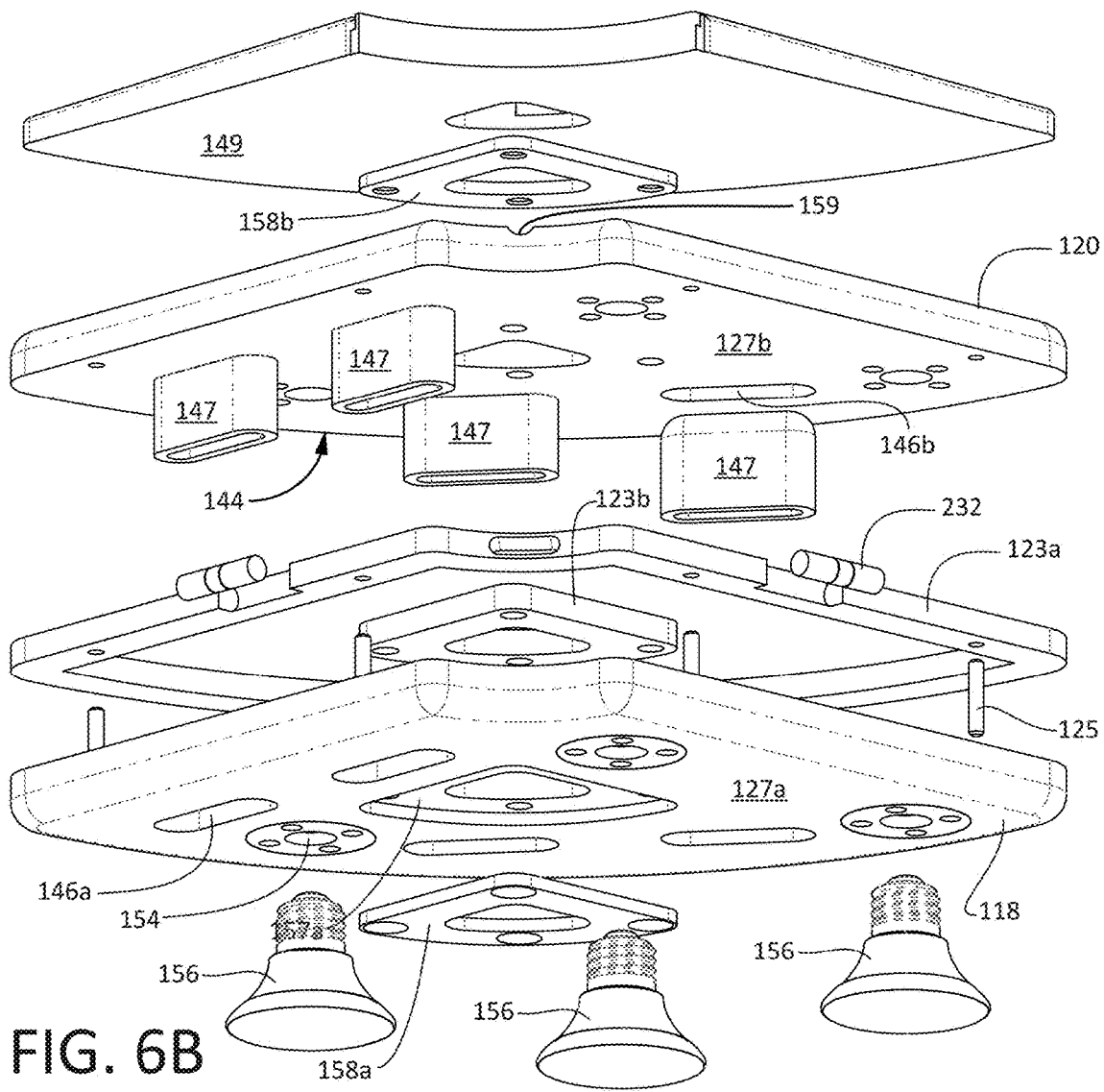
FIGS. 6A and 6B are two drawings useful for understanding a modular canopy segment which can be used in the MHS.
Figure 6A:
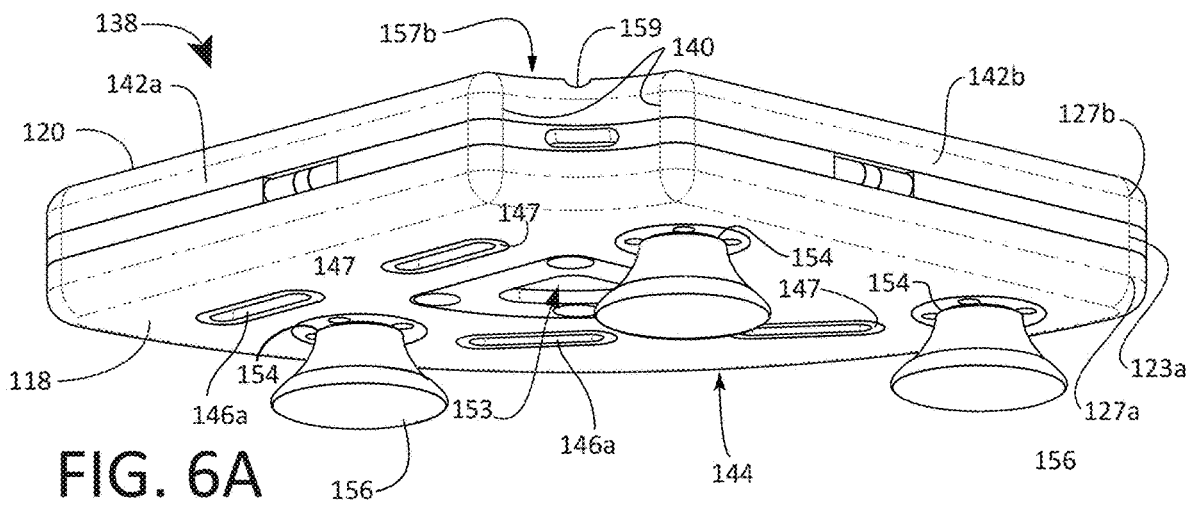

The canopy structure 108 is mounted at the upper end 107 of the rigid central pillar 102. The canopy structure 108 is comprised of a plurality of modular canopy units 138, each of which extends circumferentially around at least a portion of the rigid pillar 102. As such, each modular canopy unit can have a wedge shape as shown. Details of one such modular canopy unit 138 are shown in FIG. 6. In the scenario shown in FIGS. 1-3, each of three modular canopy units 138 respectively extends around the central axis through an arc of approximately 90°. A fourth modular canopy unit 138 could be added so that the canopy structure 108 would extend 360° completely around the pillar 102. Other configurations are also possible. For example, only one or two modular canopy units 138 can be used in some scenarios. Further, each modular canopy unit 138 can extend through a smaller or larger angle around the central axis. In such scenarios, a greater or lesser number of such modular canopy units 138 could be provided to extend through a predetermined angle around the pillar 102. The number of modular canopy units 138 included in a particular configuration of the MHS 100 can be selected in accordance with a user preference.

As shown in FIGS. 1-3 and 6, each modular canopy unit 138 includes side walls 142a, 142b which extend radially outward from the central pillar 102 a predetermined distance to a peripheral wall 144. In some scenarios, the modular canopy units 138 can extend a distance from the central pillar that is approximately commensurate with the distance of the side walls 112a, 112b which form the retention wells 121a, 121b. An inner wall 140 of each modular canopy unit 138 is advantageously contoured so as to form an arc whereby the modular canopy unit can fit snugly around the central pillar 102 as shown. The modular canopy units 138 have a lower surface 118 which faces the retention wells, and an opposing upper surface 120 which faces the underside 122 of the utility cabinet 110. An upper surface of each canopy has an indexing rod receiving-channel 159 near its inner wall. In some scenarios, the upper surface 120 can be comprised of a tapered hydration mat 149 which provides a relatively large aquatic area with a minimal amount of water being added and gravity fed outward from the pillar. A chute 153 can be provided in one or more of the modular canopy units 138. The chute 153 can define an access passageway for MHS inhabitants between the lower surface 118 and the upper surface 120. The lower and upper canopy pieces each have an embedded chute channel 157a, 157b installed whereby providing room to mount associated plates 158a, 158b to protect the chute from inhabitant damage. External and internal connection gaskets 123a, 123b separate the canopy-piece lower half 127a from its canopy-piece upper half 127b. The space created by the variable-sized gaskets provide a hollow area for canopy wires and hoses to be protected out of sight. A plurality of canopy indexing pegs 125 align and secure the canopy's lower half to its upper half.

The lower surface 118 of the modular canopy unit can include one or more accessory sockets 154. The accessory sockets are configured to couple one or more of electrical power, electrical signals and/or digital data so as to facilitate operation of one or more auxiliary electronic devices 156 when connected to the accessory sockets. Electrical power, electrical signals and/or digital data can be communicated to the modular canopy unit through coupling ports 208, 210. The accessory sockets 154 comprise suitable interface structure so as to permit the auxiliary electronic devices to be removably secured within the accessory sockets 154. The exact configuration of such interface structure is not critical. However, in some scenarios a standard screw-in or plug-in type of light socket can be used for this purpose. The auxiliary electronic devices 156 can comprise one or more of lighting elements, an electronic camera (e.g. a video camera), a microphone, a loudspeaker, a sensor (a temperature, humidity or light sensor), a thermostat, and a heating element. In some scenarios, one or more of these different types of elements can be incorporated into a single auxiliary electronic device 156.

Wall Stud Customization System

Figure 7:
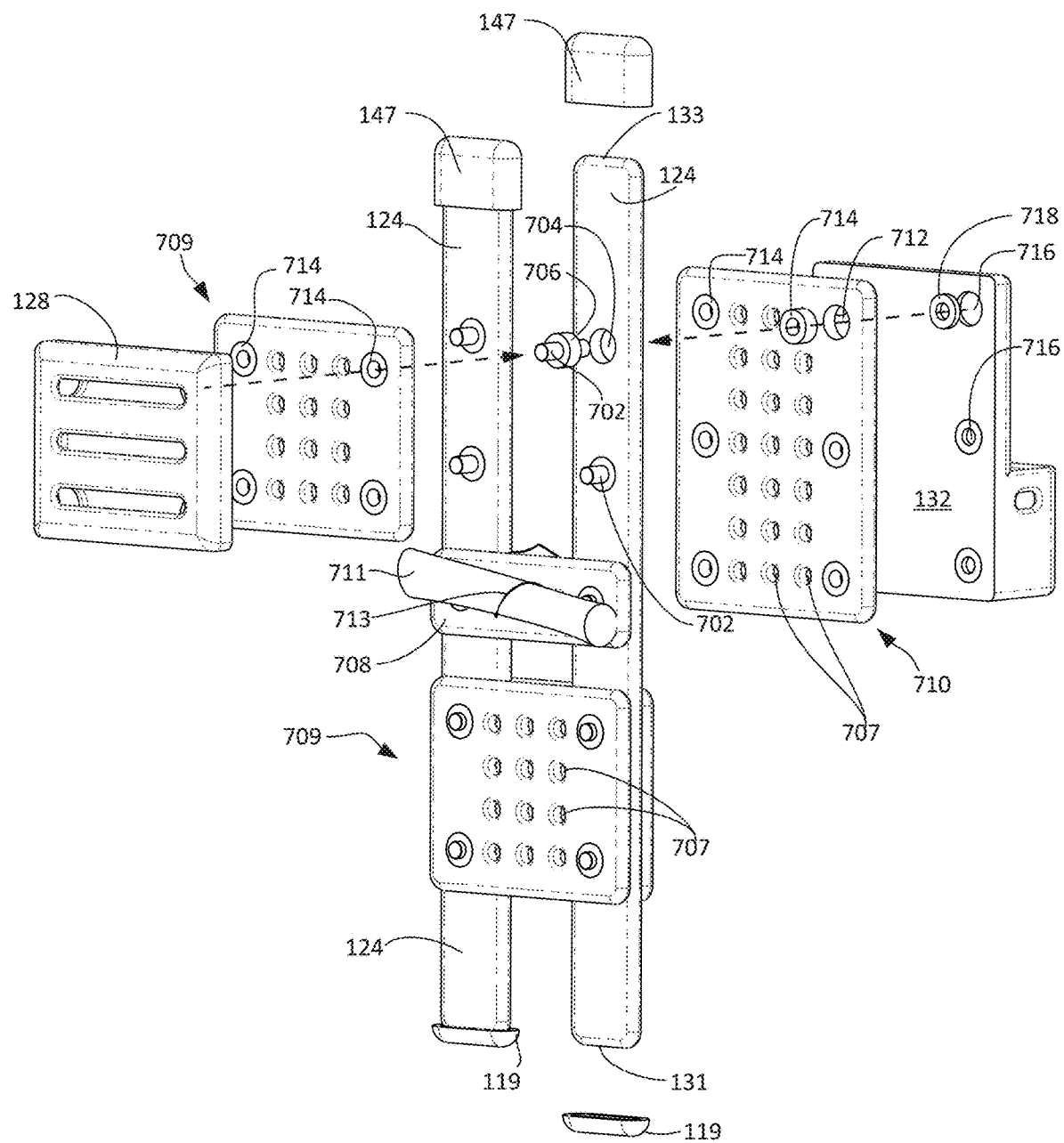
FIG. 7 is a drawing that is useful for understanding a modular wall stud system which can be used in the MHS.

As best understood with reference to FIGS. 1-3, a wall stud customization system can include a plurality of wall studs 124 which extend upwardly from the floors 116 of the retention wells 121*a*, 121*b* to the lower surface 118 of the canopy structure 110. FIG. 7 is an enlarged view which shows a wall stud customization system in further detail. As illustrated therein, the wall studs 124 are comprised of elongated rigid members with first and second opposing end portions 131, 133. In some scenarios, the wall studs 124 can be arranged in pairs as shown so as to form in combination a mounting surface for a plurality of rigid panel blanks 708, 709, 710 and customization modules 126, 128, 130, 132. In FIG. 7, only two customization modules 128, 132 are illustrated. However, it can be understood from FIGS. 1-3 that many different types of customization modules can be secured to the pairs of wall studs 124 between the opposing end portions.

In some scenarios, a position of each of the wall studs 124 can be secured by suitable structure provided in the retention well 121*a*, 121*b* and the modular canopy units 138. For example, with reference to FIGS. 3 and 5-7 it can be understood that the opposing end portions 131, 133 of the wall studs can be respectively fixed in position by channels 117 which are formed in the floor 116 of the retention wells 121*a*, 121*b* and in channel 146*b* which are formed in the downward facing plane of 127*b*. Corresponding pairs of channels/slots 117, 146*a*, 146*b* will be vertically aligned in the direction parallel to the central axis 101 so that a wall stud 124 inserted in the channels will align vertically with the central pillar 102. The end portions 131, 133 of each wall stud 124 can be snugly fitted into the channels 117, 146*b* and held in place by means of a friction fit. In some scenarios, a rubber gasket 119, 147 can be provided at the interface between the wall stud 124 and each of the channels. The rubber gaskets can dampen vibration and help facilitate a friction fit to hold the wall studs in place within the channels. Of course, other alternatives are possible. For example, simple fasteners, pegs, brackets or other such similar arrangements can likewise be used to fix the wall studs in place. All such configurations are contemplated within the scope of the present solution. The wall studs 124 will advantageously support the modular canopy units 138 in position, spaced apart from the retention wells 121*a*, 121*b*.

Further, each of the wall studs 124 can include affixation-structures arranged at predetermined intervals. The affixation-structures in the wall studs 124 can form a predetermined pattern which is designed to engage mating structures provided in each of the panel blanks 708, 709, 710 and in the customization modules 126, 128, 130, 132. For example, in a scenario shown in FIG. 7, the affixation structures in the wall studs can comprise a pattern of pegs 702, spaced at predetermined intervals to define a grid.

The pegs 702 can be advantageously disposed in apertures 704 which are defined in the wall studs. In some scenarios, the pegs 702 can be received within each aperture 704 in a resilient toroidal gasket 706 which help secure the pegs 702. According to one aspect, the pegs 702 can be of a length which is sufficient to protrude on opposing sides of the wall studs 124. Consequently, panel blanks 708, 709, 710 and customization modules 126, 128, 130, 132 can be installed on opposing sides of the wall studs as shown.

Panel blanks 708, 709, 710 can be secured on the pairs of wall studs as shown. The panel blanks have a dual purpose. A first purpose of the panel blanks is to add structural rigidity to the wall stud system. A second purpose of the panel blanks is to facilitate user customization of the panel by attaching one or more user selected customization elements 711. Customization elements 711 can be any structure that is selected to improve the MHS habitat, including food items, hiding places for inhabitants, aesthetic features, and so on. The pattern of apertures 707 disposed on each panel blank allow a conventional tie element 713 to be used to attach the customization element. Examples of tie elements that can be used for this purpose include wire ties, cable ties, and zip ties.

The wall stud apertures 712 which are formed in the panel blanks 708, 709, 710 can be sized, shaped and arranged in a spaced pattern so that at least some of the apertures align with the grid pattern defined by the pegs 702. In some scenarios, the pegs 702 can be formed of a magnetic material, and the apertures 712 can be defined by a toroidal shaped magnetic element 714. Consequently, the toroidal shaped magnetic elements 714 will be magnetically attracted to each peg when the two elements are moved into close proximity. With the foregoing arrangement, each panel blank will magnetically latch on to a wall stud when the apertures 712 are inserted over the pegs 702.

Similarly, each customization module can have a plurality of apertures 716 defined by toroidal shaped magnetic elements 718. The apertures 716 can be arranged in a pattern or grid in which apertures 716 align with pegs 702. Consequently, each customization module can be received on a panel blank as shown and will be magnetically latched in place when the toroidal shaped magnetic elements 714 are slipped over the pegs 702. According to one aspect, a size of a panel blank 708, 709, 710 can be matched to a size of a particular customization module 126, 128, 130, 132 which is to be installed on the wall studs in a particular position.

With the foregoing arrangement, the system is easily assembled and disassembled, without tools. Moreover, the customization modules 126, 128, 130, 132 can be easily added, removed or rearranged on the wall studs. In some scenarios, a similar arrangement of affixation structures including pegs 702 arranged in a predetermined grid pattern, can be provided on the peripheral walls 114 of the retention wells 121*a*, 121*b*. Peripheral wall customization modules 234 have a correspondingly arcuate-shaped back side and can also be easily added, removed, and rearranged on the retention well's peripheral wall similar to 126, 128, 130, 132 being rearranged on the wall stud system.

Utility Cabinet

Figure 8B:
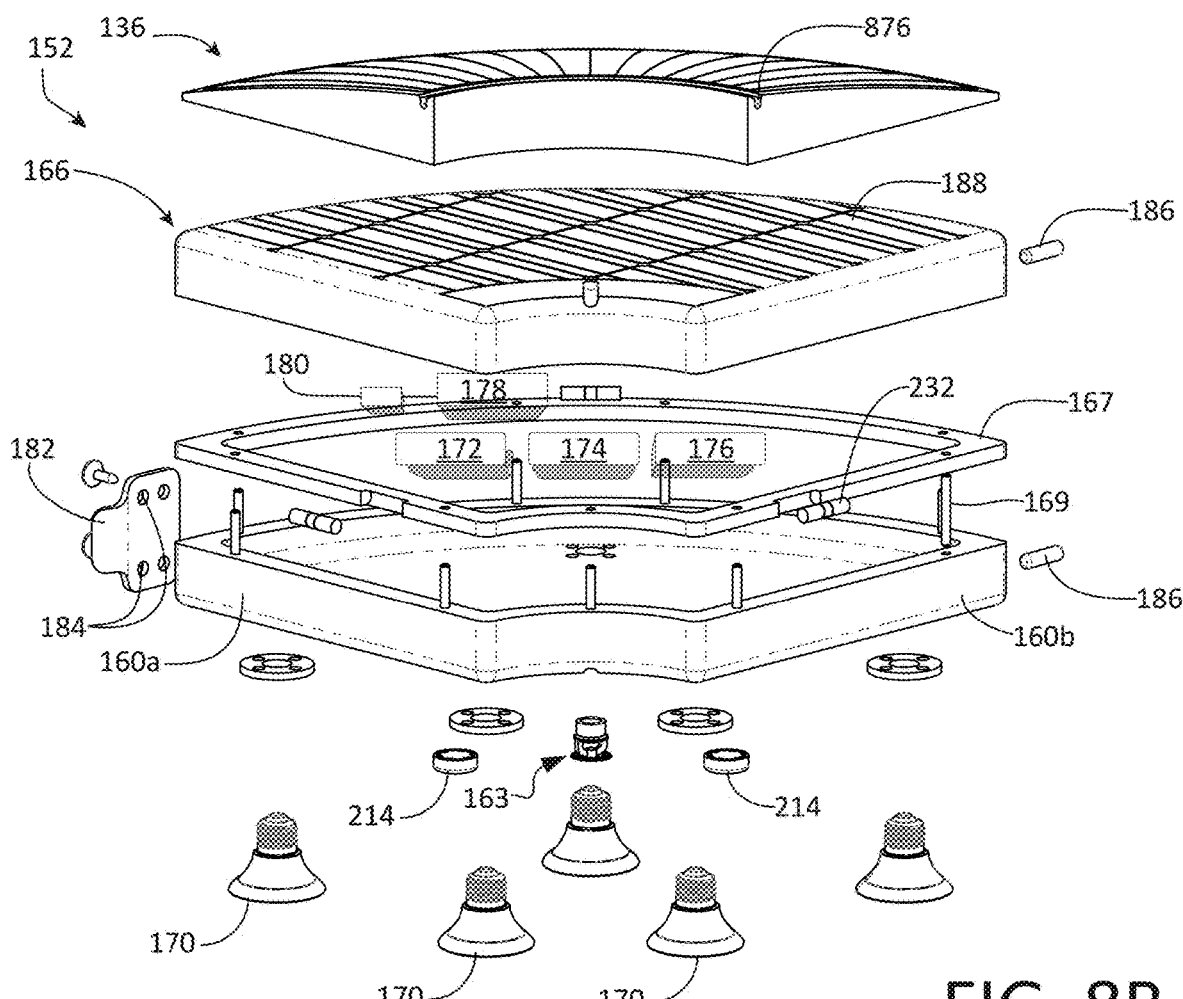
FIGS. 8A and 8B are a series of drawings which are useful for understanding a modular utility cabinet system.
Figure 8A:
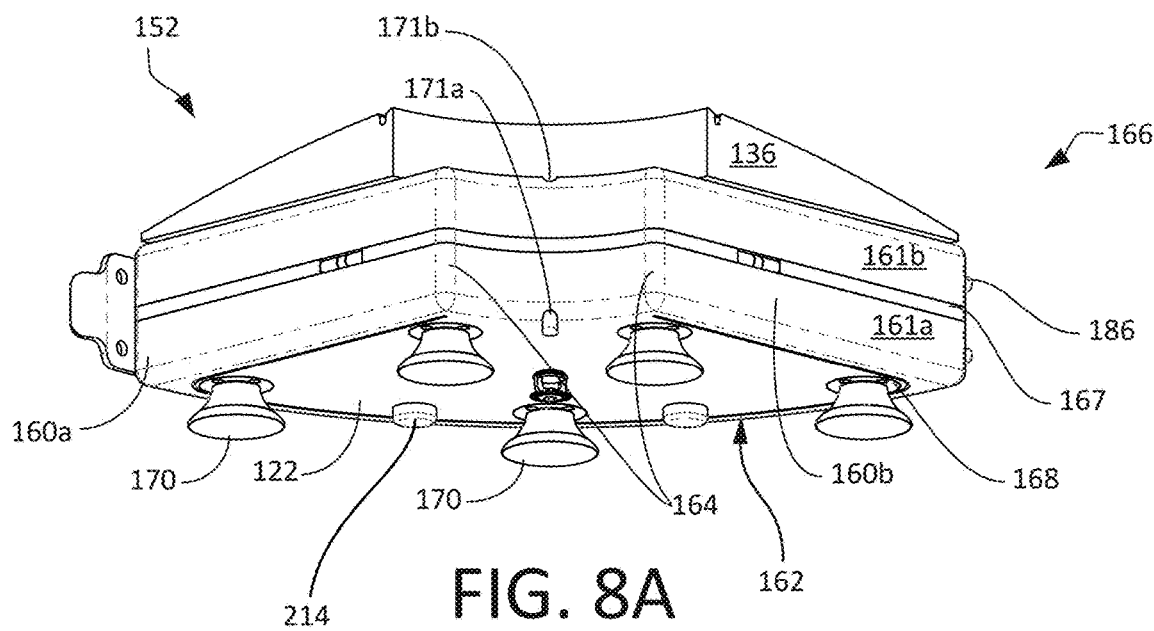

The utility cabinet 110 is comprised of a plurality of modular utility cabinet units 152, each of which extends circumferentially around at least a portion of the rigid pillar 102. As such, each modular utility cabinet unit can have a substantially wedge-like shape as shown. Details of one such modular utility cabinet unit 152 are shown in FIGS. 8A and 8B. In the scenario shown in FIGS. 1-3, each of three modular utility cabinet units 152 respectively extends around the central axis through an arc of approximately 90°. A fourth modular utility cabinet unit 152 could be added so that the utility cabinet 110 would extend 360° completely around the pillar 102. Other configurations are also possible. For example, only one or two modular utility cabinet units 152 can be used in some scenarios. Further, each modular utility cabinet unit 152 can respectively extend through a smaller or larger angle, such that a greater or lesser number of such modular utility cabinet units 152 could be provided to extend through a predetermined angle around the pillar 102. The number of modular utility cabinet units 152 can be selected in accordance with a user preference. However, it is advantageous for the number of modular utility cabinet units 152 to match the modular canopy units 138, and the number of retention wells 121a, 121b so that the various components can be aligned as shown in FIGS. 1-3.

Each modular utility cabinet unit 152 is comprised of a lower and upper shell 161a, 161b separated by a gasket 167 and aligned and secured into place by a plurality of indexing pegs 169. Side walls 160a, 160b extend radially outward from the central axis 101 a predetermined distance to a peripheral wall 162. In some scenarios, the modular utility cabinet units 152 can extend a distance from the central pillar that is greater than the distance of the side walls 112a, 112b which form the retention wells 121a, 121b. An abutting inner wall 164 of each modular utility cabinet unit 152 is advantageously contoured so as to fit snugly around the central pillar 102 as shown. The modular utility cabinet units 152 each have an underside 122 which faces the upper surface 120 of the canopy structure 108. The modular utility cabinet units also have an opposing upper surface 166. A photovoltaic panel 188 can be disposed on the upper surface 166, beneath a transparent lens panel 136. The transparent lens panel can be used to concentrate solar radiation onto the photovoltaic panel and/or simply to protect the photovoltaic panel from dirt and debris.

The underside 122 of each modular utility cabinet unit 152 can include one or more accessory sockets 168. The accessory sockets 168 are configured to couple one or more of electrical power, electrical signals and/or digital data so as to facilitate operation of one or more auxiliary electronic devices 170 when connected to the accessory sockets. The accessory sockets 168 also comprise suitable interface structure so as to permit the auxiliary electronic devices to be removably secured within the accessory sockets 168. The auxiliary electronic devices 170 can comprise one or more of lighting elements (e.g., LED lights), an electronic camera (e.g. a video camera), a microphone, a loudspeaker, a sensor (a temperature, humidity or light sensor), a thermostat, a fan, and a heating element. In some scenarios, one or more of these different types of elements can be incorporated into a single auxiliary electronic device 170.

One or more of the modular utility cabinet units 152 can also include on the underside 122 a fluid port or spray nozzle 163 and/or a lighting element 214. In some scenarios, the lighting element 214 can be a suitable LED type lighting element of a color which is selected to help attract insect life to the MHS.

The modular utility cabinet units 152 can define an internal space in which are housed various functional components of the MHS 100. For example, one or more of the modular utility cabinet units 152 can house one or more of a storage battery 172, power management circuitry 174, and electronic control circuitry 176. In some scenarios, a fluid-cistern 178 can also be integrated into one or more of the modular utility cabinet units 152 for storing a fluid, such as water. Suitable flow control mechanisms can be provided to couple the fluid cistern to the fluid port or spray nozzle 163. The flow control mechanisms can include but are not limited to a fluid conduit (not shown), and one or more electronically controlled valves 180 for controlling a flow of fluid to the spray nozzle 163. The flow control mechanism can be under the control of the electronic control circuitry 176. The purposes of these various components associated with the modular utility cabinet units 152 will be explained below in greater detail.

Tensioning straps or latches can be used to prevent the modular utility cabinet units 152 from becoming dislodged from their position abutting the pillar 102. For example, one or more tensioning straps 182 can be provided which extend between adjacent ones of the modular utility cabinet units. In some scenarios, the tensioning straps 182 can be formed of a resilient or elastic material. Examples of suitable materials for this purpose can include materials such as rubber, elastic polymer or neoprene. The tensioning straps 182 can be similar in configuration to the tensioning straps 115. As such, the tensioning straps 182 can be secured to the outer peripheral wall 162 adjacent to where the peripheral wall intersects with a side wall 160b. The tensioning straps 182 can be configured to include a simple latching structure whereby they can be secured to an adjacent modular utility cabinet unit. For example, in some scenarios the tensioning straps can include apertures 184 which are configured to receive nubs 186 disposed on a peripheral wall of an adjacent modular utility cabinet unit. The elastic material of the tensioning strap 182 will thereafter ensure that the tensioning strap remains in place. The tensioning straps 182 help secure the adjacent modular utility cabinet units together and prevent them from becoming dislodged from the pillar 102. The utility cabinet's bottom and top side each have a radially-aligned indexing-rod channel 171a, 171b which receive indexing rods 155 from docking plates 195, 193. When elongated bolts 1218 are torqued down, the docking plates provide an adjustable-tension clamping function further solidifying this overhanging structure.

Example Alternative Configuration

FIG. 9 shows an MHS 800 that is similar to the MHS 100. As such, the MHS 800 is comprised of a rigid central pillar 102 which serves as a main structural member upon which the various major system components are supported, including a moat assembly 804, a retention cabinet system 806, a canopy structure 808, and a utility cabinet 810.

One difference between the MHS 100 and the MHS 800 is that MHS 800 includes only two segments or wedges to form several of the major system components, rather than the three segments which are included in MHS 100. In particular, the MHS includes only two segments to form the retention cabinet system 806, the canopy structure 808, and the utility cabinet 810. Since each individual wedge or segment (121a, 121b, 138, 152) in this example extends through an arc of approximately 90°, it will be understood that the combination of two segments or wedges in FIG. 9 will extend only about 180° around the central axis 801. An MHS configuration as shown which has only two wedges or segments for most major components can be convenient in some scenarios where a more compact MHS form factor is desirable. Likewise, in some scenarios, it may be convenient (or more economical) to have an MHS configuration in which only one or two segments is used for most or all major components. The arrangement of the moat assembly 104 is a special case and in some scenarios may comprise a different number of segments as compared to the remainder of the major system components.

It should be understood that except for the difference in the number of segments or wedges that may be used to complete each of the several major system components, an MHS 100 can be constructed in substantially the same way as the MHS 800. Similarly, an MHS with a greater or lesser number of segments (e.g., one segment or four segments) for the various major components could be assembled a similar way. For example, FIG. 10 shows an MHS 900 having a similar design as MHS 100 and 800, but only including a single 90° segment for each of the major system components. The exception in this example is the moat assembly 904 which has non-conforming moat pieces 943 and a non-conforming moat platform 945.

Base System

Figure 11:
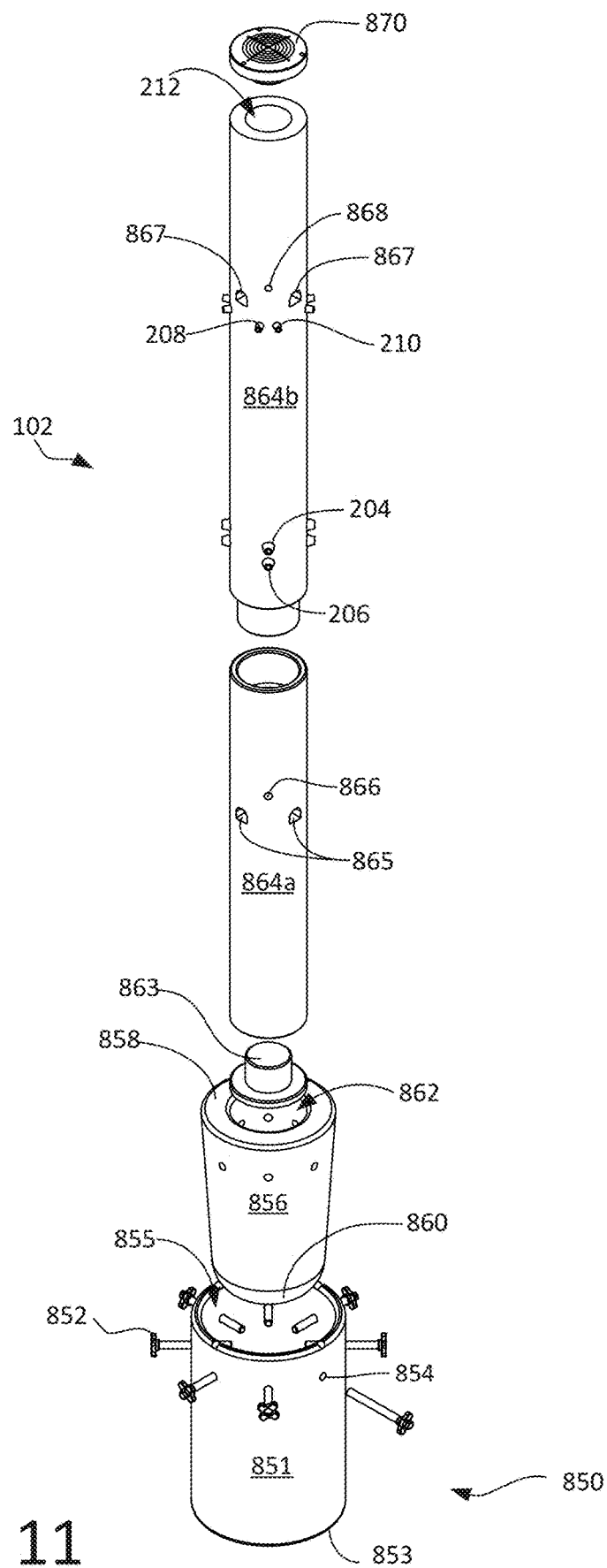
FIG. 11 is a drawing that is useful for understanding a foundation/leveler system which can be used to support and level the MHS.

In some scenarios, it can be advantageous to mount the MHS on a base. Such a base mounted configuration is shown in FIG. 9. More particularly, an MHS 100, 800, 900 can in some scenarios be disposed on a base pedestal 850. Details of such a base pedestal will now be described in relation to FIG. 11. As illustrated therein, the base pedestal can comprise a rigid tubular element 851 having a central bore defined therein. An insert member 856 is received within the tubular element 851 and rests against a floor 853. The insert member 856 can be slightly tapered from an upper end 858 to a lower end 860 such that it forms a conical or frustoconical shape. A tip portion of the lower end 860 advantageously has a somewhat rounded form so that it can tilt or rock on the floor to a small extent within the confines of the central bore 855.

The central pillar 102 has a cushion gasket 863 inserted into and around its hollow tip wherein the combined pole with cushioned tip is received in an aperture 862 which extends along the central axis of the insert member 856. As shown, the central pillar 102 can be comprised of one or more sections, such as a lower section 864a, and an upper section 864b. Each pillar section can include radially aligned: wire/hose channels 865, 867 and lateral bolt holes 866, 868 (both features explained further below). The insert member 856 is supported in the central bore 855, and fixed in place, by a plurality of screws 852. To engage the insert member 856, the screws 852 are rotated within threaded holes 854 defined in the tubular element 851. In this way, the screws can securely engage the insert member 856. A leveling function of the MHS can be achieved by selectively varying an extent to which the screws 852 on different sides of the insert member will protrude into the central bore 855 to engage the side of the insert member. These changes will vary the vertical orientation of the central pillar to allow the MHS system components to be easily leveled. The uppermost hollow pole section area has a 360 bubble level 870 inserted and secured into place whereby providing the owner a visual guide when leveling adjustments are being made by the base pedestal's adjustment screws 852. Encircling the bubble level 870 is the lens panel core cap 872 (see FIG. 12A). This core cap has an outer ridge 874 which is seated in a lens panel solidification channel 876 whereby when pushed down into place, a tight, water-resistant seal is created. Additionally, when the core cap is removed, easy access to the elongated threaded bolts 1218 is provided.

Modular Architecture and Assembly

Figure 12C:
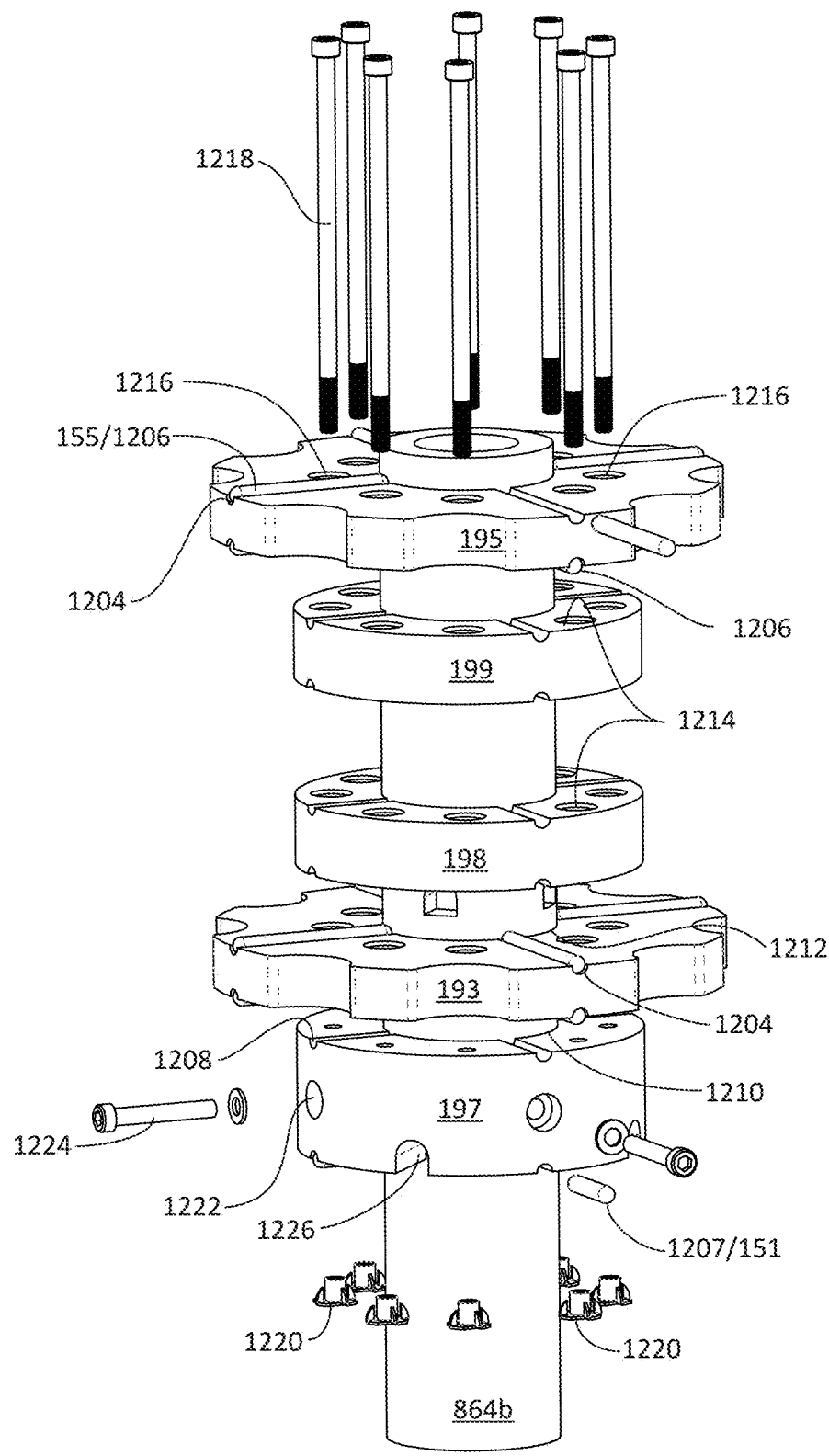
FIG. 12C is an exploded view which is useful for understanding how a plurality of core rings and docking plates are used to facilitate assembly of the MHS.

An important aspect of an MHS 100 is its ease of assembly and disassembly by a user. Such ease of assembly and disassembly is facilitated by certain unique design features of the system, which are described below in further detail in relation to FIG. 12A-12C. In FIG. 12A an MHS 100 is shown in which several of the segments comprising the major system components are removed to show certain details of the assembly.

It can be observed in FIGS. 12A and 12B that the various vertically aligned segments which comprise the major system components are essentially comprised of a stack disposed on the rigid pillar 102. Beginning from the base 850, the stack includes a core ring 135, a docking plate 191, the moat platform segment, a rigid core ring 192, and a docking plate 190, with the one or more moat platform segments being clamped in place between the core ring/docking plate 135/191 combined structure and the core ring/docking plate 192/190 combined structure. Resting on top of the docking plate 190 are one or more segments which comprise the retention cabinet system 106 (e.g., retention well 121b). A plurality of wall studs 124 extend upwardly from the retention well(s) 121a, 121b, in a direction aligned with the central axis, to support one or more segments of the canopy structure 108 (as defined by the modular canopy units 138).

The fixed-in-place (explained further below) rigid core ring 197 is used to provide a space or gap between the utility cabinet 110 and the canopy structure 108. On top of the rigid core ring 197 is a docking plate 193, core rings 198, 199, and a docking plate 195. One or more segments which comprise the utility cabinet are abutted to core rings 198, 199, and clamped in place between docking plates 193, 195.

One or more of the core rings can have a thickness (e.g., a thickness t) in the direction of the central axis. This distance can be different in the case of different core rings depending upon the position of the core ring in the MHS assembly. In contrast, the docking plates can conform to a predetermined standard set of dimensions and in some scenarios can be interchangeable.

Referring now to FIG. 12C there is shown a detailed view of a pillar assembly comprised of core rings and docking plates. FIG. 12C displays how a possible upper pole assembly of core rings 197, 198, 199 and docking plates 193, 195 may be arranged. However, all of the core rings and docking plates in the MHS can have a similar configuration respective to the core rings and docking plates which are shown and described in FIG. 12C. As shown in FIG. 12C, each core ring 197, 198, 199 can have a central bore 1210, which allows the core ring to be snugly fitted over the exterior of the upper portion of the shown central pillar 864b. Similarly, each docking plate 193, 195 can have a central bore 1212, which allows the docking plate to be snugly fitted over the exterior of the rigid pillar. The core rings and the docking plates can each include a plurality of alignment structures that facilitate the vertical or axial alignment of the MHS system segments along the length of the rigid pillar. For example, in some scenarios, the alignment structures in a core ring can comprise indexing-rod channel(s) 1208 which are configured to receive indexing rods 1206 disposed in axially adjacent components, such as a docking plate 195. Other configurations of alignment structure are also possible.

The core rings and docking plates can also include a plurality of core-ring and docking plate bolt-holes 1214, 1216. A plurality of threaded bolts 1218 can extend respectively through the plurality of docking plates and core rings. The threaded bolts can be secured in place by a plurality of threaded retention nuts 1220. In some scenarios the threaded retention nuts 1220 can be embedded in a core ring or a docking plate. The core rings and docking plates can be used advantageously to facilitate alignment among all adjoined components throughout the structure. A thicker core-ring such as 197 may have lateral bolt holes 1222 installed to receive lateral bolts 1224 which intersect with corresponding central pillar lateral bolt holes 866 whereby transferring all the MHS's upper assembly's weight directly to the central pillar and on down to the base structure. Additionally, a plurality of radially aligned core ring wire/hose channels 1226 may be mirror-aligned to central pillar wire/hose channels 866 whereby permitting the owner to easily attach external wire and hose harnesses to various MHS gear as needed.

Interactive Control System

Figure 13:
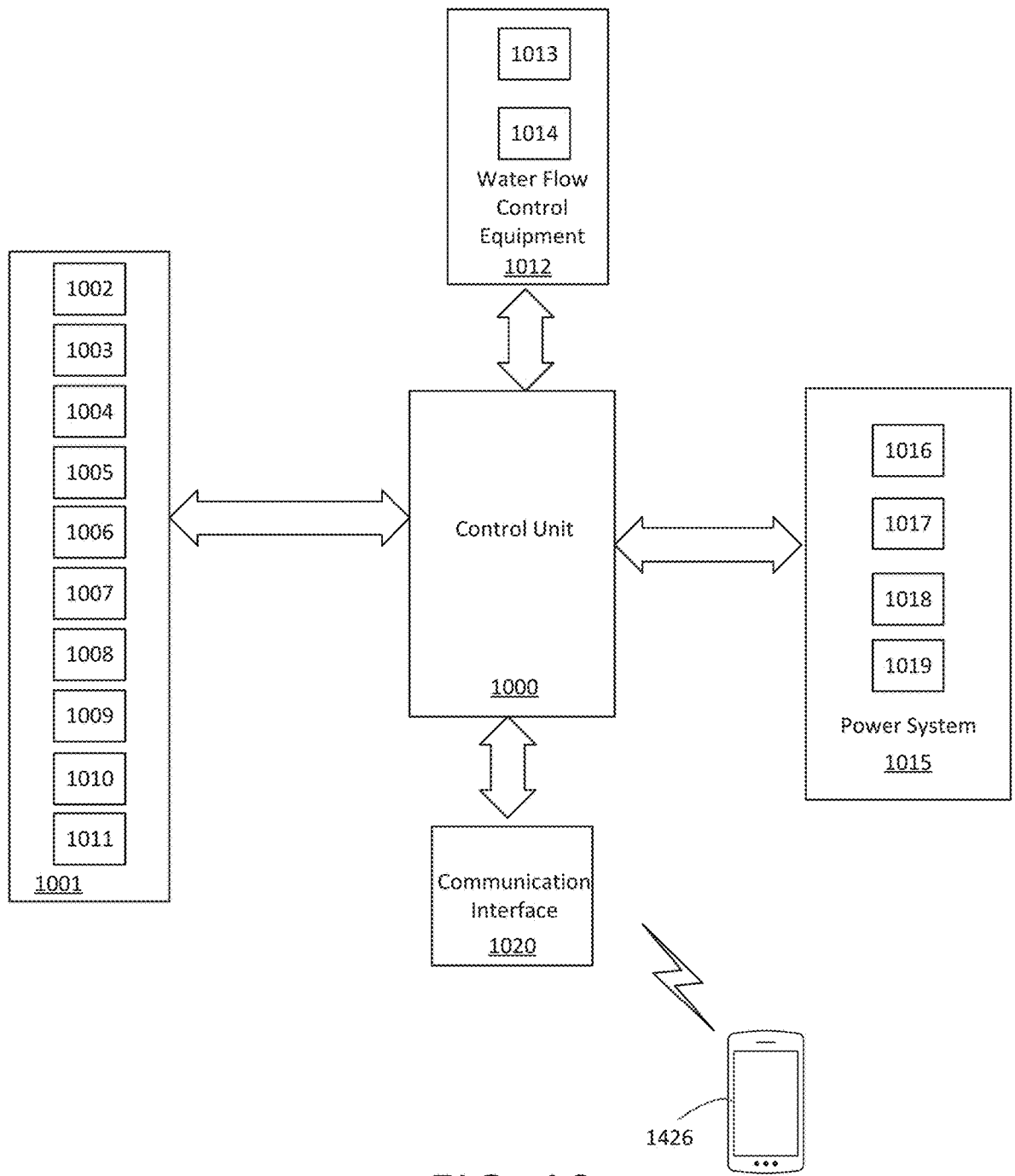
FIG. 13 is a block diagram which is useful for understanding a system for controlling, monitoring, and interacting with an MHS.

From the foregoing discussion it will be understood that the MHS solution presented herein can include various functional components disposed at various locations within the system. As shown in FIG. 13, one or more of these and other components of the MHS can be under the control of a control unit 1000. A communication interface 1020 facilitates command, control and monitoring of the MHS using a remote device, such as a desktop computer, a laptop computer, tablet computer, or smartphone. The functional components which are under the control of the control unit 1000 can include electronic components, electro-mechanical components, optical components, and electro-optical components.

For example, functional components 1001 can include one or more mood light(s) 1002, insect-attracting light(s) 1003, camera(s) 1004, electronically adjustable camera lens(es) 1005, microphone(s) 1006, loudspeaker(s) 1007, sensor(s) 1008, thermostat(s) 1009, electric heating element(s) 1010, and electric air-moving devices such as fans or blowers 1011. In some scenarios one or more of these components can be mounted in an accessory socket (e.g., an accessory socket 168). Other types of functional components are also possible, for example, one or more laser-dot spotting scopes can be provided, attached to a small water cannon to facilitate irrigation of difficult to reach places within the MHS, and thwart predators and/or thieves.

In some scenarios, a loudspeaker 1007 can be supplied with audio signals to facilitate MHS operation. For example, an audio signal can be selected to cause the loudspeaker to play certain creature-specific breeding sounds whereby a particular type of wildlife inhabitant can be attracted to the MHS and encouraged to take up residence therein. A creature-specific sentry-sound may be triggered to play over the one or more loudspeakers to silence the wild inhabitants (mostly adult amphibians) when a predetermined decibel level has been exceeded. The cameras 1004 used in the system can include electronic video cameras with lenses capable of facilitating a zoom function, including macro. A video feed from such video cameras 1004 can be used in conjunction with a microphone 1006 to provide a user a real-time ability to observe and listen to the natural occurrences taking place within the MHS environment.

Other important functional components of the system include water flow control equipment 1012. For example, these elements can include a water pump 1013 (e.g., for moving water from the retention wells, through conduits to certain spray or drip nozzles), and one or more electronically controlled valves 1014 for selectively controlling or directing a flow of water to one or more spray or drip nozzles. The MHS can also have an independent electrical power system 1015 including a battery 1018, a photovoltaic panel 1016 and/or optional wind mill 1017 for charging the battery, and a suitable charge controller 1019 for controlling the battery charging operations. A communication interface 1020 establishes a communication link between the MHS gear and the user.

The control unit 1000 can comprise one or more components such as a processor, an application specific circuit, a programmable logic device, a digital signal processor, or other circuit programmed to perform the functions described herein. The control unit can be realized in one computer system or several interconnected computer systems. Any kind of computer system or other apparatus adapted for carrying out the methods described herein is suited. In some scenarios, the control unit can comprise a general-purpose computer system. The general-purpose computer system can have a computer program that can control the computer system such that it carries out the methods described herein.

The control unit 1000 can control the various functional components of the MHS. These functions can be carried out by the control unit autonomously, or in response to commands received from a user device 1426. For example, the control unit 1000 can control the operation of one or more mood light(s) 1002, insect-attracting light(s) 1003, camera(s) 1004, electronically adjustable camera lens(es) 1005, microphone(s) 1006, loudspeaker(s) 1007, sensor(s) 1008, thermostat(s) 1009, electric heating element(s) 1010, and air-moving devices such as electric fans or blowers 1011. Sensors 1008 can include one or more of temperature sensors, moisture sensors, motion sensors, water level sensors and valve position sensors.

An audio signal provided to the loudspeaker can be selected from among a plurality of audio tracks which are stored in a memory of the control unit 1000, or user device 1426. The control unit 1000 can be responsive to a user command to select a particular audio track. The control unit 1000 can select from among video outputs of two or more available video cameras 1004. This selection can be autonomous, random or in response to a user command. Likewise, the control unit can control the operation of lenses capable of facilitating a zoom function responsive to a user command. In some scenarios, video images from one or more video cameras 1004 can be caused by the control system to be communicated to the user device. This video imagery can be communicated in conjunction with detected audio from a microphone 1006 to provide a user a real-time telepresence within the MHS environment.

The control system can use the pump and/or other flow control components to selectively determine when and how much water is flowing from the various spray nozzles. In some scenarios, these operations can be controlled based on sensor inputs received by the control unit, and an application of an appropriate computer algorithm. The control unit can also selectively control functions pertaining to the operation of the solar panel and/or wind mill for the charging of the battery.

Figure 14:
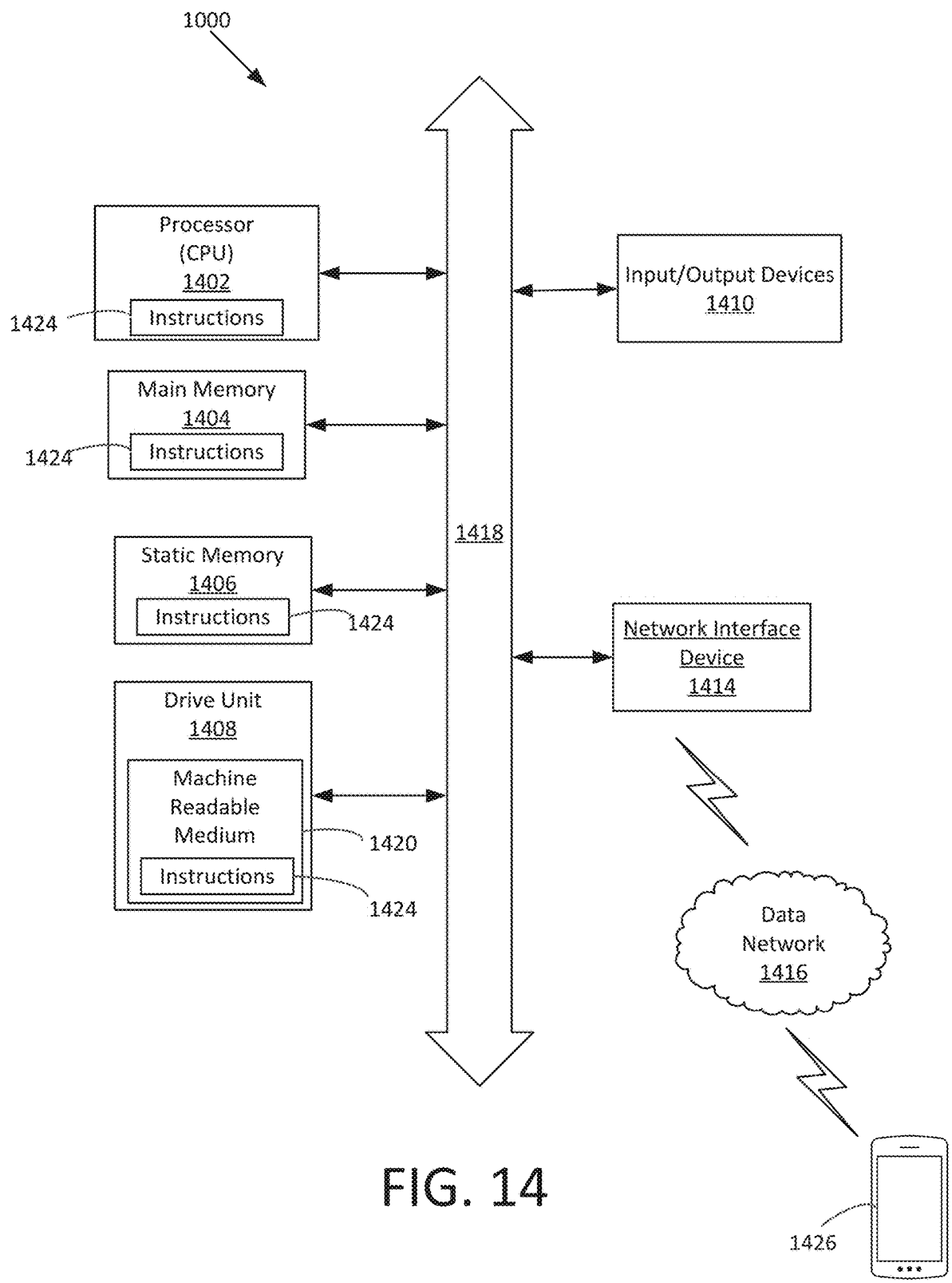
FIG. 14 is a block diagram that is useful for understanding one example of a control unit for the MHS.

Referring now to FIG. 14, there is shown a hardware block diagram comprising an example of a control unit 1000. The machine can include a set of instructions which are used to cause the computer system to perform any one or more of the methodologies discussed herein. In some scenarios, the control unit 1000 can operate independently as a standalone device. However, the disclosure is not limited in this regard and in other scenarios the control unit can be operatively connected (networked) to other machines in a distributed environment to facilitate certain operations described herein. Accordingly, while only a single machine is illustrated it should be understood that in other scenarios the system can be taken to involve any collection of machines that individually or jointly execute one or more sets of instructions as described herein.

The control unit 1000 is comprised of a processor 1402 (e.g. a central processing unit or CPU), a main memory 1404, a static memory 1406, a drive unit 1408 for mass data storage and comprised of machine readable media 1420, input/output devices 1410 for communicating signals and/or data to/from MHS system components, and a network interface device 1414 to facilitate communications with a user device. Communications among these various components can be facilitated by means of a data bus 1418. One or more sets of instructions 1424 can be stored completely or partially in one or more of the main memory 1404, static memory 1406, and drive unit 1408. The instructions can also reside within the processor 1402 during execution thereof by the computer system. The network interface device 1414 can be comprised of hardware components and software or firmware to facilitate wired or wireless network data communications. The wireless network data communications can be in accordance with any suitable network communication protocol utilized in a data communication network 1416 so as to facilitate data communication with a user device 1426.

The drive unit 1408 can comprise a machine readable medium 1420 on which is stored one or more sets of instructions 1424 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. A tangible medium as described herein is one that is non-transitory insofar as it does not involve a propagating signal.

Control unit 1000 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Operation

A fully equipped MHS 100 creates an ideal space for nature and an interactive awareness enhancing tool for the user. Rainwater harvesting and solar energy collection facilitate completely off-grid operation of the MHS. The husbandry and attraction of live food sources for the inhabitants to prey on creates a balanced ecosystem in a low maintenance structure, and in this respect is similar to the way that natural systems function. Video cameras and adjustable zoom lenses allow the user to zoom in and observe the inner workings of a nature space in a wild setting. The frugal use of primarily gravity-fed flow-through water provides a relatively large aquatic footprint with a minimal amount of water. Expandability and simplicity of use are the two prime design strategies employed throughout the system. Moreover, the MHS is a mechanically solid structure fabricated to last for many centuries.

Notably, the smallest stand-alone working component of the MHS is the retention well 121a or 121b. Therefore, a user may start by purchasing 121a, the water well, as a simple Goldfish bowl or purchasing 121b, the soil well, as a simple plant box. Nothing further would need to be purchased. It is a simple, small well of water or soil capable of limitless expandability.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

The invention claimed is:

1. A modular habitat structure (MHS) for accommodating one or more live inhabitants, comprising:
   a rigid pillar which extends along a major axis from a base end to an upper end opposed from the base end;
   a plurality of major system components, each disposed at a different one of a plurality of locations along a length of the rigid pillar;
   each of the major system components extending radially outward from the rigid pillar and each comprised of one or more segments which individually extend circumferentially around at least a portion of the rigid pillar;
   each of the segments having a predefined modular configuration, whereby the MHS is user adjustable to a plurality of different configurations by selectively adding or removing one or more segments of the major system components to circumferentially vary an extent of each of the major system components around a periphery of the rigid pillar;
   a control unit integrated into the MHS comprising a computer processor configured to control a plurality of electronic devices integrated into the MHS; and
   one or more accessory sockets integrated with the MHS and communicatively coupled to the control unit, each configured to removably receive a plug associated with one or more of the plurality of the electronic devices when being installed in the MHS, and each comprising one or more of a power source and a data interface;
   wherein the plurality of electronic devices include one or more video cameras responsive to the control unit to generate one or more video streams of a wildlife habitat within the MHS, and the control unit is configured to selectively cause at least one video stream to be communicated from the MHS to a remote computing device;
   wherein the plurality of major system components comprises
   (i) a canopy structure that is coupled to the rigid pillar at an upper end so as to extend outward into an open air space surrounding the MHS, and (ii) a retention cabinet system coupled to the rigid pillar adjacent to a base end so as to be spaced apart from the canopy structure and extend outward into the open air space surrounding the MHS, the canopy structure defining a lower surface which faces the retention cabinet system, and the retention cabinet system defining at least one retention well in the form of an open bowl for retaining soil and/or water media therein, a sidewall of the at least one retention well comprising a port configured to be aligned with a corresponding port of an adjacent sidewall of an adjacent retention well to facilitate fluid flow, the sidewall extending between a front wall and an opposing rear wall of the at least one retention well, the rear wall being adjacent to the rigid pillar, a food access drawer fit within an access shell integrated in the retention cabinet of a soil media containing well, wherein the food access drawer is inserted and removed through the front wall of the retention cabinet, a valve control knob on the front wall of the retention cabinet and connected to an integrated drain pipe within the retention cabinet of a water media well, wherein the valve control knob regulates periodic drainage of the water media well;

wherein the canopy structure and the retention cabinet are positioned on the rigid pillar spaced between a utility cabinet above the canopy structure and a moat assembly below the retention cabinet; and wherein at least one wall stud has an elongate length arranged to extend parallel to and spaced apart from the rigid pillar, and arranged to extend vertically from the lower surface of the canopy structure and into the at least one retention well of the retention cabinet system; and wherein a plurality of different customization modules are configured to each (i) facilitate a respective one of a plurality of different habitat functions, (ii) be removably coupled to the at least one wall stud, and (iii) be selectively interchanged with other ones of the plurality of customization modules to allow customization of habit functionality.

2. The MHS of claim 1, wherein the control unit further comprises a communication interface device configured to facilitate data communication between the control unit and the remote computing device.

3. The MHS of claim 2, wherein the control unit is configured to select the at least one video stream in accordance with at least one of an autonomous process and in response to a user generated video stream selection received from the remote computing device.

4. The MHS of claim 2, wherein the video camera includes at least one electronically adjustable lens, and the control unit is configured to control the lens responsive to a user generated lens control selection received from the remote computing device.

5. The MHS of claim 2, wherein the plurality of electronic devices further include at least one microphone configured to capture audio from within the MHS, and the control unit is configured to selectively cause an audio signal generated by the microphone to be communicated with the at least one video stream from the MHS to the remote computing device.

6. The MHS of claim 2, wherein the rigid pillar is comprised of at least one internal conduit which extends through the pillar and houses a wire harness configured to facilitate data communication between the control unit and the one or more accessory sockets.

7. The MHS of claim 1, wherein the plurality of electronic devices further include at least one lighting element, and the control unit is configured to selectively control at least one characteristic of the at least one lighting element.

8. The MHS of claim 7, wherein the at least one lighting element has a light output color which is attractive to insects.

9. The MHS of claim 1, wherein the plurality of electronic devices further include a loudspeaker, and the control unit is configured to selectively control the output of the loudspeaker to achieve a particular result selected from the group consisting of attracting one or more specific types of live inhabitants to reside in the MHS, and silencing the live inhabitants.

10. The MHS of claim 1, wherein the plurality of electronic devices further include at least one of a water pump and an electronically controlled valve to selectively control a flow of water from at least one water storage container integrated into the MHS, to one or more flow nozzles integrated in one or more of the major system components.

11. The MHS of claim 1, wherein the one or more accessory sockets are disposed on a lower surface of the canopy structure.

12. The MHS of claim 1, wherein an upper surface of the canopy structure is comprised of a plurality of ridges which define a shallow pattern of water retention pools in the face of the upper surface to facilitate water retention on the upper surface.

13. The MHS of claim 12, wherein the upper surface of the canopy structure is tapered downwardly toward the base end of the rigid pillar to facilitate a flow of fluid in a radial direction away from the rigid pillar.

14. The MHS of claim 1, further comprising a tapered hydration mat disposed on an upper surface of the canopy structure and that is gravity fed water outward from the rigid pillar.

15. The MHS of claim 1, wherein at least one of the plurality of different customization modules is configured to accommodate one or more of the live inhabitants suspended between the canopy structure and the retention cabinet system.

16. The MHS of claim 1, wherein the plurality of major system components further comprise the moat assembly mounted on the rigid pillar at the base end, the moat assembly including a plurality of flow channels at varying elevations to facilitate a flow of water from a flow channel at a highest elevation to a lowest elevation, each of the flow channels comprising an elongated open bowl in which a fluid can be contained.

17. The MHS of claim 1, wherein the plurality of major system components further comprise the utility cabinet mounted on the rigid pillar at the upper end, the utility cabinet comprising one or more of a battery, a photovoltaic panel, a charge control system for the battery and the control unit.

18. The MHS of claim 1, further comprising a first magnetic element disposed on the sidewall of the at least one retention well and a second magnetic element disposed on the adjacent sidewall of the adjacent retention well, wherein the first and second magnetic elements are configured to magnetically attract each other for facilitating an assembly of the at least one retention well together with the adjacent retention well.

19. The MHS of claim 1, wherein the port of the sidewall of the at least one retention well comprises a flow prevention plate configured to transition between an open position and a closed position for facilitating a selective control of the fluid flow.

20. A modular habitat structure (MHS) for accommodating one or more live inhabitants, comprising:
a rigid pillar which extends along a major axis from a base end to an upper end opposed from the base end;
a plurality of major system components, each disposed at a different one of a plurality of locations along a length of the rigid pillar;
each of the major system components extending radially outward from the rigid pillar and each comprised of one or more segments which individually extend circumferentially around at least a portion of the rigid pillar;
each of the segments having a predefined modular configuration, whereby the MHS is user adjustable to a plurality of different configurations by selectively adding or removing one or more segments of the major system components to circumferentially vary an extent of each of the major system components around a periphery of the rigid pillar;
a control unit integrated into the MHS comprising a computer processor configured to control a plurality of electronic devices integrated into the MHS;
a communication interface device configured to facilitate data communication between the control unit and a remote computing device;
wherein the plurality of major system components comprise
a canopy structure that is coupled to the rigid pillar at an upper end so as to extend outward into an open air space surrounding the MHS, and
a retention cabinet system coupled to the rigid pillar adjacent to a base end so as to be spaced apart from the canopy structure and extend outward into the open air space surrounding the MHS, the canopy structure defining a lower surface which faces the retention cabinet system, and the retention cabinet system defining at least one retention well in the form of an open bowl for retaining soil and/or water media therein, a sidewall of the at least one retention well comprising a port configured to be aligned with a corresponding port of an adjacent sidewall of an adjacent retention well to facilitate fluid flow, the sidewall extending between a front wall and an opposing rear wall of the at least one retention well, the rear wall being adjacent to the rigid pillar, a food access drawer fit within an access shell integrated in the retention cabinet of a soil media containing well, wherein the food access drawer is inserted and removed through the front wall of the retention cabinet, a valve control knob on the front wall of the retention cabinet and connected to an integrated drain pipe within the retention cabinet of a water media well, wherein the valve control knob regulates periodic drainage of the water media well;
wherein the canopy structure and the retention cabinet are positioned on the rigid pillar spaced between a utility cabinet above the canopy structure and a moat assembly below the retention cabinet; and
wherein the plurality of electronic devices include
one or more video cameras responsive to the control unit to generate one or more video streams of a wildlife habitat within the MHS, and the control unit is configured to selectively cause at least one video stream to be communicated from the MHS to a remote computing device;
a microphone configured to capture audio from within the MHS, the control unit configured to selectively cause an audio signal generated by the microphone to be communicated with the at least one video stream from the MHS to the remote computing device;
at least one lighting element configured to attract an insect food source for the live inhabitants; and
a loudspeaker, wherein the control unit is configured to selectively control the output of
the loudspeaker to attract one or more specific types of live inhabitants to reside in the MHS.

21. The MHS of claim 20, wherein the control unit is configured to select the at least one video stream in accordance with at least one of an autonomous process and in response to a user generated video stream selection received from the remote computing device.

22. The MHS of claim 20, wherein the plurality of electronic devices further include at least one of a water pump and an electronically controlled valve to selectively control a flow of water from at least one water storage container integrated into the MHS, to one or more flow nozzles integrated in one or more of the major system components.

* * * * *